United States Patent
Takahashi et al.

(10) Patent No.: US 9,187,807 B2
(45) Date of Patent: Nov. 17, 2015

(54) α+BETA-TYPE TITANIUM ALLOY PART AND METHOD OF PRODUCTION OF SAME

(75) Inventors: Kazuhiro Takahashi, Tokyo (JP); Akira Kawakami, Tokyo (JP); Tomonori Kunieda, Tokyo (JP); Motomi Masaki, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 724 days.

(21) Appl. No.: 13/513,026

(22) PCT Filed: Dec. 2, 2010

(86) PCT No.: PCT/JP2010/072058
§ 371 (c)(1),
(2), (4) Date: May 31, 2012

(87) PCT Pub. No.: WO2011/068247
PCT Pub. Date: Jun. 9, 2011

(65) Prior Publication Data
US 2012/0234066 A1 Sep. 20, 2012

(30) Foreign Application Priority Data
Dec. 2, 2009 (JP) .................................. 2009-274817

(51) Int. Cl.
C22C 14/00 (2006.01)
C22F 1/18 (2006.01)

(52) U.S. Cl.
CPC ................ *C22C 14/00* (2013.01); *C22F 1/183* (2013.01)

(58) Field of Classification Search
CPC .................................. C22F 1/183; C22C 14/00
USPC .................................................. 420/417–418
See application file for complete search history.

(56) References Cited

U.S. PATENT DOCUMENTS
5,026,520 A * 6/1991 Bhowal et al. ................. 148/670

FOREIGN PATENT DOCUMENTS
JP 61-257446 11/1986
JP 05-209251 8/1993
(Continued)

OTHER PUBLICATIONS
Song, Jin-Hwa, et al. "The effect of hot rolling condition on the anisotropy of mechanical properties in Ti—6Al—4V alloy." Materials Science and Engineering: A 449 (2007): 144-148.*
(Continued)

*Primary Examiner* — Jessee Roe
(74) *Attorney, Agent, or Firm* — Kenyon & Kenyon LLP

(57) ABSTRACT

A method of production of an α+β-type titanium alloy part for a motorcycle, car, or bicycle which has a high Young's modulus (rigidity) in the axial direction of the shaped product and a bolt, engine valve, or connecting rod made of an α+β-type titanium alloy and a method of production of the same, wherein an α+β-type titanium alloy is heated at the temperatures giving the β-single phase, then is uni-directionally hot rolled, the plate is machined so that a direction vertical to both the hot rolling direction and thickness direction (width direction) corresponds to the direction in which high rigidity is demanded in the finished part, that is, the axial direction of the bolt, engine valve, or connecting rod, and the X-ray diffraction intensities I(0002), I(10-10), and I(10-11), of the (0002) plane, (10-10) plane, and (10-11) plane of the titanium α-phase measured at the cross-sections vertical to the longitudinal axial direction of the parts satisfy I(0002)/[I(10-10)+I(10-11)]≥1.

6 Claims, 5 Drawing Sheets

(56) References Cited

FOREIGN PATENT DOCUMENTS

| | | |
|---|---|---|
| JP | 9-182932 | 7/1997 |
| JP | 2663802 | 10/1997 |
| JP | 2006-308027 | 11/2006 |
| JP | 2008-208413 | 9/2008 |
| JP | 2009-174709 | 8/2009 |

OTHER PUBLICATIONS

International Search Report dated Mar. 8, 2011, issued in corresponding PCT Application No. PCT/JP2010/072058.

* cited by examiner ns
α+BETA-TYPE TITANIUM ALLOY PART AND METHOD OF PRODUCTION OF SAME This application is a national stage application of International Application No. PCT/JP2010/072058, filed Dec. 2, 2010, which claims priority to Japanese Application No. 2009-274817, filed Dec. 2, 2009, the content of which is incorporated by reference in its entirety.

TECHNICAL FIELD

The present invention relates to a bolt, engine valve, connecting rod, or other α+β-type titanium alloy part and a method of production of the same.

BACKGROUND ART

A titanium alloy has a density of about 60% of steel and shows a high relative strength (=tensile strength/density), so is being used for machine parts for which lighter weight is demanded such as bolts, engine valves, and connecting rods.

As typical α+β-type titanium alloys which are used for such machine parts, Ti-6 mass % Al-4 mass % V (hereinafter referred to as "Ti-6Al-4V") and Ti-3 mass % Al-2.5 mass % V (hereinafter "Ti-3Al-2.5V") are used.

The shape of these machine parts is in general similar to that of rods which have long axes (except large ends and small ends of connecting rods). Force is likely to be applied in the long axis direction, so rigidity in the long axis direction is particularly demanded.

To raise the rigidity of a machine part, it is sufficient to increase the cross-sectional area of that part. However, if just increasing the cross-sectional area, the mass of the machine part increases. To raise the rigidity without increase in the mass of the machine part, it is necessary to increase the Young's modulus of the material itself.

The Young's modulus of titanium (at room temperature) is 88 to 113 GPa (9,000 to 11,500 kgf/mm$^2$) which is as a small value as about a half that of a ferrous material, so titanium with high Young's modulus is highly needed.

Further, in addition to the above machine parts, in general, metallic materials with a high Young's modulus are desired for applications for machine parts of motorcycles, cars, and bicycles.

Titanium consists of the α-phase which is comprised of the hexagonal close-packed lattice (hereinafter "hcp") and the β-phase which is comprised of the body centered cubic lattice (hereinafter "bcc"). The Young's modulus of the α-phase is around 110 GPa, while that of the β-phase is around 90 GPa. The α-phase has about 20% higher Young's modulus than the β-phase.

For this reason, as explained above, α+β-type titanium alloys, mainly comprised of the α-phase, are being used for bolts, connecting rods, engine valves, etc. for which high rigidity is demanded.

As a method for increasing the Young's modulus of a titanium alloy, for example, there is the method of adding B (boron) to the titanium alloy and causing metal borides with high Young's moduli to be dispersed so as to raise the rigidity (for example, PLT 1).

In addition, there is the method of making a composite of high Young's modulus SiC fibers or carbon fibers with a titanium alloy (composite material).

For production of bolts, engine valves, and connecting rods made of a titanium alloy, round bars which are produced by hot working are being used as materials.

Bolts are produced by hot or cold forging or rolling, or cutting a round bar material.

The method of production of an engine valve includes an upset method consisting of heating an edge part of the round bar material to form an umbrella-like part and a hot extrusion method in which a round bar material is hot-extruded.

Connecting rods are produced by hot forging a round bar material.

In the above way, machine parts made of a titanium alloy are mainly being produced using round bars made of the titanium alloy as materials.

It is known that the hcp titanium α-phase has crystal orientation anisotropy in Young's modulus. The crystal orientation of the longitudinal direction of the round bar used as a material has a large influence on Young's modulus.

In a high strength titanium alloy columnar shape (round bar) which is produced by hot rolling and is the material for cold forging, crystal orientations in which c-axes of hcp are aligned in the circumferential direction or radial direction of the columnar shape are accumulated. Further, it is learned that the X-ray diffraction intensity from (0002) basal plane of the hcp measured on the T-cross-section of the columnar shape is extremely low and that the c-axes of the hcp are not accumulated in the longitudinal direction of the columnar shape (PLT 2).

CITATIONS LIST

Patent Literature

PLT 1: Japanese Patent No. 2663802
PLT 2: Japanese Patent Publication (A) No. 2008-208413

SUMMARY OF INVENTION

Technical Problem

The titanium alloy which is disclosed in PLT 1 has a room temperature tensile strength of about 1000 to 1300 MPa, an elongation of about 3 to 14%, and a Young's modulus of about 140 to 160 GPa.

However, hard titanium boride particles which are dispersed in the alloy show low ductility and toughness, so sometimes become the initiation sites of fatigue cracks.. Further, bolts, connecting rods, etc. are often machined at the final stage of finishing the product. Titanium boride and other metal boride particles are hard, so the load on the edge of cutting bit during machining is high and sometimes the cutting efficiency (machining efficiency) is lowered.

Further, when using a titanium alloy which contains B as a remelting material, concentration of B increases and mechanical properties are affected, so it is difficult to use B-containing alloy as a raw material for another general titanium alloy. This type of alloy is not preferable from the viewpoint of recycling. In a composite material consisting of SiC fiber or carbon fiber, etc. and of a titanium alloy, it costs high to separate the fiber from titanium for recycling. In this way, composite materials have problems in view of recycling.

In the conventional process, round bars which are produced by hot rolling or hot forging are used as the materials for bolts, engine valves, and connecting rods. In this case, the long axis direction of the final product corresponds to the longitudinal direction of the round bar.

That is, to raise a Young's modulus in the long axis direction of the final product, it is necessary to make the Young's modulus of the longitudinal direction of the round bar high, which is used as the material. For this reason, it is necessary to develop the crystal orientation consisting of a high Young's modulus in the longitudinal direction of the round bar precedently..

However, in a round bar made of an α+β-type titanium alloy which is produced by hot rolling or hot forging, the Young's modulus in the longitudinal direction is as low as 110 GPa, since a texture mainly comprised of crystals whose c-axes are aligned in the circumferential direction or radial direction of the columnar shape (round bar) develops, and a texture consisting of crystal orientations with a high Young's modulus of the hcp α-phase do not necessarily develop in the longitudinal direction.

In a material which is obtained by sintering using titanium powders, the crystal orientation of the α-phase and β-phase is random, where no specific orientation is dominant. As a result, a Young's modulus is almost uniform in all directions. It is difficult to increase a Young's modulus in a specific orientation.

Even in powder metallurgy, by adding B and forming titanium boride or another substance with a high Young's modulus, it is possible to raise the average Young's modulus, but, as explained above, forming a composite material by the addition of B etc. has issues in availability for recycling.

The present invention was made in consideration of the above situation and the objective of it is to provide a method of production of an α+β-type titanium alloy part for motorcycle, car, or bicycle with a high Young's modulus (rigidity) in the axial direction of the product compared with a product produced from a conventional round bar material without using a composite material and a method of production of a bolt, engine valve, or connecting rod made of an α+β-type titanium alloy.

Furthermore, the objective of the invention is to provide a bolt, engine valve, or connecting rod made of an α+β-type titanium alloy with a high Young's modulus (rigidity) in the axial direction of the product.

Solution to Problem

The inventors studied in depth about a method of production which raises the Young's modulus in the long axis direction of bolts, engine valves, connecting rods, and other α+β-type titanium alloy parts. As a result, they discovered that by heating an α+β-type titanium alloy to the temperature region of the single phase of β, and uni-directionally hot rolling it to a plate and processing a part from this plate so that the direction vertical to both the hot rolling direction and the thickness direction of the plate (below also referred to as "the width direction" of the plate) corresponds to the direction in which high rigidity is demanded in the finished part, the Young's modulus in the axial direction becomes higher than the α+β-type titanium alloy part which is obtained by a conventional round bar material.

More specifically, when producing bolts, engine valves, and connecting rods, the inventers discovered that by machining the plate so that the width direction of it corresponds to the long axial direction of the bolts, engine valves, and connecting rods, the Young's modulus in the axial direction becomes higher than that of bolts, engine valves, and connecting rods machined from the conventional round bar materials.

It was learned that in the bolts, engine valves, connecting rods, and other α+β-type titanium alloy parts which are obtained by the above method of production, the X-ray diffraction intensity from the (0002) plane of the α-phase (hcp) measured in the cross-section vertical to the long axis direction is higher than the sum of the X-ray diffraction intensities from the (10-10) plane and the (10-11) plane, which is different from the conventional process using round bar materials.

The present invention was made based on the above discoveries and furthermore on discovery of chemical compositions of the α+β-type titanium alloy suitable for the method of production of the present invention enabling stable material properties by adding more inexpensive alloying elements.

The gist of the present invention is as follows:

(1) A method of production of an α+β-type titanium alloy part comprising heating the α+β-type titanium alloy to the β-single phase region, then hot rolling it uni-directionally to obtain a titanium alloy plate, then processing the titanium alloy plate into a part so that the direction vertical to both the hot rolling direction and the thickness direction corresponds to the direction in which high rigidity is demanded in the finished part.

(2) A method of production of an α+β-type titanium alloy part of (1) characterized in that the finished part is a bolt and in that the direction in which high rigidity is demanded is the axial direction of the bolt.

(3) A method of production of an α+β-type titanium alloy part of (1) characterized in that the finished part is an engine valve and in that the direction in which high rigidity is demanded is the axial direction of the engine valve.

(4) A method of production of an α+β-type titanium alloy part of (1) characterized in that the finished part is a connecting rod and in that the direction in which high rigidity is demanded is the axial direction of the connecting rod.

(5) A method of production of an α+β-type titanium alloy part of (4) characterized in that the titanium alloy plate is forged from cross-sectional sides which are vertical to the hot rolling direction.

(6) A method of production of an α+β-type titanium alloy part of any one of (1) to (5) characterized in that the α+β-type titanium alloy contains, by mass %, Al: 0.5 to 5.5%, contains O and N in a total of 0.04 to 0.35%, further contains one or more of Fe, Cr, and Ni in a total of 0.5 to 2.5%, has a value of the following formula (1) of −2.0 to 5.3, and has a balance of Ti and unavoidable impurities.

$$[Al]+10[O]+10[N]-[Mo]-2.5[Fe]-1.25[Cr]-1.25[Ni] \quad \text{formula (1)}$$

where, [Al], [O], [N], [Mo], [Fe], [Cr], and [Ni] are respectively the concentrations (mass %) of Al, O, N, Mo, Fe, Cr, and Ni.

(7) A method of production of an α+β-type titanium alloy part of (6) characterized in that the α+β-type titanium alloy further contains Mo: 1.0 to 3.5%.

(8) An α+β-type titanium alloy part, characterized in that the X-ray diffraction intensity I(0002) from the (0002) plane of the titanium α-phase which is measured on a cross-section vertical to the long axis direction of the part, the X-ray diffraction intensity I(10-10) from the (10-10) plane, and the X-ray diffraction intensity I(10-11) from the (10-11) plane satisfy $I(0002)/[I(10\text{-}10)+I(10\text{-}11)] \leq 1$.

(9) An α+β-type titanium alloy part of (8) characterized in that the α+β-type titanium alloy part is a bolt.

(10) An α+β-type titanium alloy part of (8) characterized in that the α+β-type titanium alloy part is an engine valve.

(11) An α+β-type titanium alloy part of (8) characterized in that the α+β-type titanium alloy part is a connecting rod.

(12) An α+β-type titanium alloy part of (8) to (11) characterized in that the α+β-type titanium alloy contains, by mass %, Al: 0.5 to 5.5%, contains O and N in a total of 0.04 to 0.35%, further contains one or more of Fe, Cr, and Ni in a total of 0.5 to 2.5%, has a value of formula (1) of −2.0 to 5.3, and has a balance of Ti and unavoidable impurities.

(13) An α+β-type titanium alloy part of (12) characterized in that the α+β-type titanium alloy further contains Mo: 1.0 to 3.5%.

Here, an "α+β-type titanium alloy" is a titanium alloy which is comprised of two phases of the α-phase and the β-phase at room temperature and has a chemical composition in which the α-phase stabilizing elements of Al, O, N, etc. and the β-phase stabilizing elements of Fe, Cr, Ni, V, Mo, etc. are simultaneously added. Typical examples of α+β-type titanium alloys are Ti-6Al-4V (JIS type 60) and Ti-3Al-2.5V (JIS type 61).

The "β-single phase region" is the temperature region where titanium becomes the single phase of β at a temperature higher than this temperature. The β-single phase region of Ti-6Al-4V and that of Ti-3Al-2.5V slightly differ depending on the chemical composition, and are respectively about 990° C. or more and about 935° C. or more.

"Uni-directionally hot rolling" means hot rolling in a single direction by a tandem rolling mill, reverse rolling mill, Steckel rolling mill, etc. without hot rolling in a direction crossing the hot rolled material by about 90° (cross rolling). This includes reheating after rolling to further hot roll uni-directionally several times.

As examples of unavoidable impurities of the α+β-type titanium alloy, there are 0.08 mass % or less of C, 0.0150 mass % or less of H, etc.

Advantageous Effects of Invention

According to the present invention, it is possible to produce α+β-type titanium alloy parts for motorcycles, cars, or bicycles with a higher Young's modulus (rigidity) in the axial direction of the products compared with products made from conventional round bar materials without the use of composite materials and to produce bolts, connecting rods, and engine valves made of an α+β-type titanium alloy.

DESCRIPTION OF EMBODIMENTS

When an α+β-type titanium alloy is used as a part for motorcycle, car, or bicycle, and if the titanium alloy part has an elongated shape, high rigidity in the longitudinal direction is often demanded in the part.

Here, the "elongated shape" means a shape where the dimension in the longitudinal direction is greater than both the dimension in the width direction and that in the thickness direction.

When the titanium alloy part is a bolt, engine valve, connecting rod, shaft (cam shaft, crankshaft, drive shaft, etc.), arm (rocker arm, upper arm, lower arm, etc.), pedal (brake pedal and gear pedal of motorcycle), or frame part of a motorcycle, the direction of the finished part in which high rigidity is demanded is the long axis direction of each part.

Below, the elements of the present invention will be explained in detail.

First, the method of increasing a Young's modulus in a specific direction in a material which is processed into a bolt, engine valve, connecting rod, etc. will be explained.

<Method of Production>

The Young's modulus of titanium is higher in the α-phase compared with the β-phase. It is known that the α-phase has anisotropy in the Young's modulus due to the crystal orientation of the hcp α-phase and that the modulus is the highest in the c-axial direction of the α-phase. Therefore, it is possible to make the c-axes of the α-phase strongly slant in a predetermined orientation so as to raise the Young's modulus of the long axis direction of a part.

If heating the α+β-type titanium alloy to the temperature region of the single phase of β, and then uni-directionally hot rolling it to a plate shape, it is possible to make the c-axes of the α-phase strongly accumulated in the direction vertical to both the hot rolling direction and the thickness direction, that is, the width direction of the plate. The Young's modulus in that direction rises to 125 GPa or more.

When uni-directionally hot rolling an α+β-type titanium alloy into a plate, unless heating to the temperature region of the single phase of β, that is, when heating to the low temperature range comprised of the α+β dual phase region, the Young's moduli of the width direction and that of the rolling direction are at most about 120 GPa.

Further, when heating a billet in the low temperature α+β dual phase region or β-single phase high temperature region and hot rolling it into a round bar as well, the Young's modulus in the longitudinal direction is in each case 104 to 118 GPa or so. It is not possible to increase the Young's modulus much at all.

Figure 1:
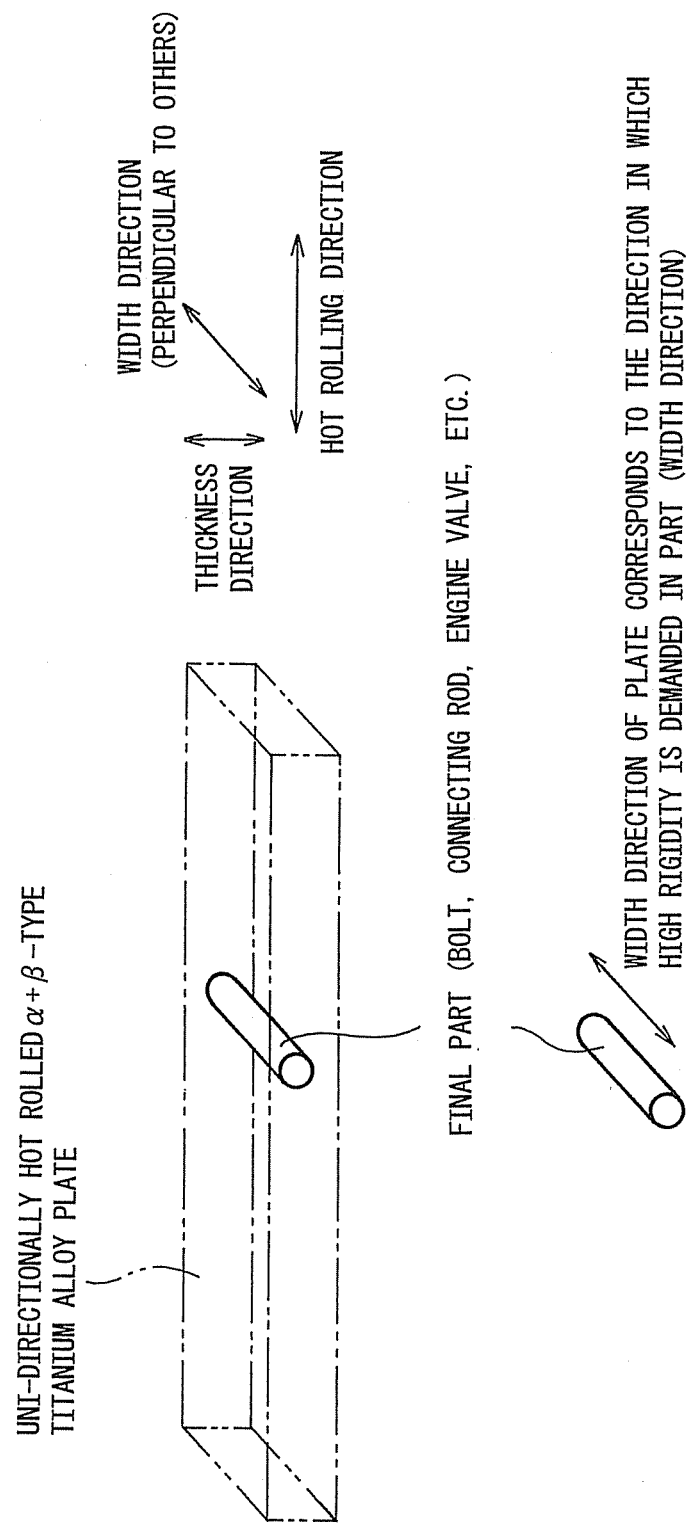
FIG. 1 is a schematic drawing which shows the relationship between the direction of an α+β-type titanium alloy plate which is uni-directionally hot rolled and that of the final part.

FIG. 1 shows the relationship between the directions of an α+β-type titanium alloy plate which is uni-directionally hot rolled and those of the final part in the present invention.

Further, FIGS. 2(a), (b), and (c) are schematic drawings of a bolt, engine valve, and connecting rod and show the long axis directions in which high rigidity is demanded.

From the above, in the method of production of an α+β-type titanium alloy part for a motorcycle, car, or bicycle based on the present invention, a titanium alloy plate which is obtained by heating an α+β-type titanium alloy to the β-single phase region and uni-directionally hot rolling it, as shown in FIG. 1, are processed in the way that the width direction of the hot rolled plate corresponds to the direction in which high rigidity is demanded in the finished part.

Figure 2:
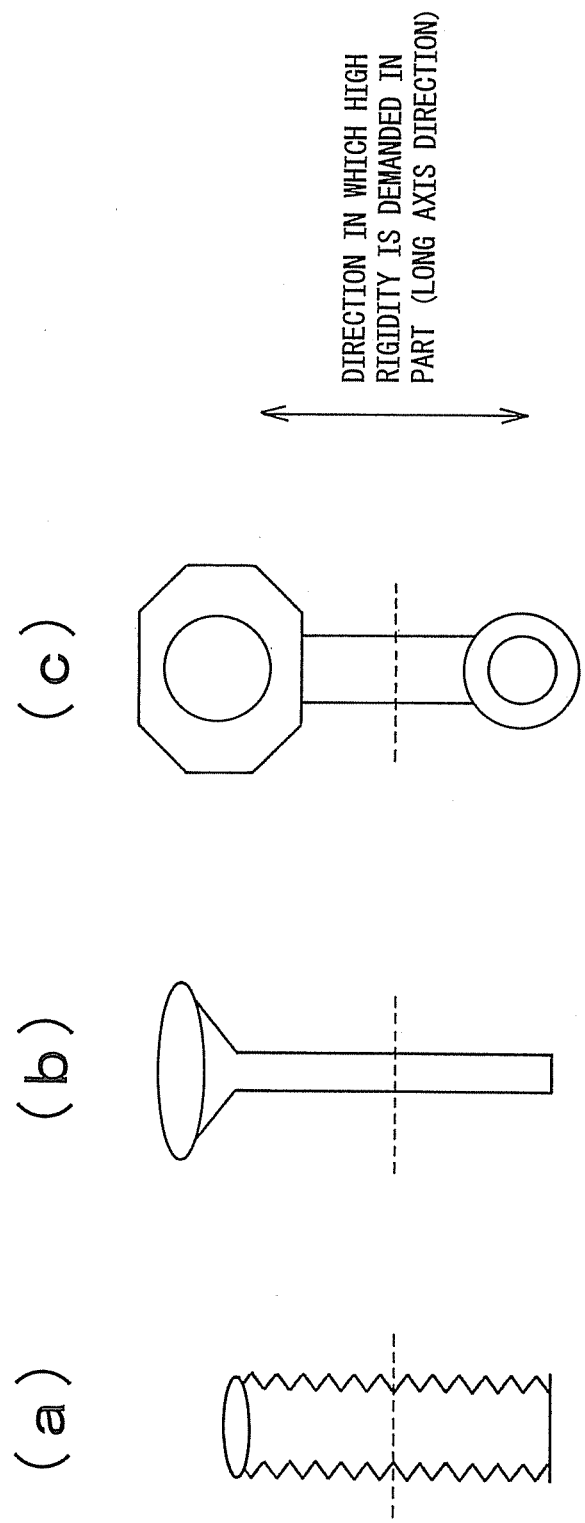
FIG. 2 is a schematic illustration which shows the long axis direction in which high rigidity is demanded in a finished part, wherein (a) shows a bolt, (b) an engine valve, and (c) a connecting rod.

Further, in the method of production of the bolt, engine valve, and connecting rod of the present invention, when machining a titanium alloy plate which is obtained by heating an α+β-type titanium alloy to the β-single phase region and uni-directionally hot rolling it, the plate is processed so that the width direction of the hot rolled plate (see FIG. 1) corresponds to the long axis direction of the parts (see FIG. 2).

A titanium alloy plate which is uni-directionally hot rolled and used as a material has a high Young's modulus in the width direction (125 GPa or more), so parts for motorcycles, cars, or bicycles and, further, bolts, engine valves, and connecting rods which are produced from this plate also have a high Young's modulus (rigidity) in the long axis direction.

Considering the shape of a bolt, engine valve, and connecting rod, the thickness of the α+β-type titanium alloy plate obtained by heating to the β-single phase region and uni-directionally hot rolling it is 5 mm or more. Furthermore, 10 mm or more is preferable. The lower limit of the plate thickness is determined from the shape of the automotive part to be produced. The upper limit of the plate thickness is preferably 70 mm or less from the viewpoint of reducing the load during cutting the plate.

When heating an α+β-type titanium alloy to the β-single phase region and uni-directionally hot rolling it, it is preferable to start the hot rolling in the β-single phase region (uni-directionally hot rolling in β-single phase region). After that, along with the progress in the hot rolling, it is possible to finalize hot rolling in the low temperature α+β dual phase region.

The preferable heating temperature is +10 to +100° C. higher than the temperature giving the β-single phase (β transus) for suppressing oxidation during heating as much as possible.

After the hot rolling, in accordance with need, the material is annealed in the α+β double-phase region. The annealing temperature is preferably 650 to 850° C. since it relieves strain and promotes recrystallization.

When hot forging the hot rolled titanium alloy plate into the part, the heating process prior to the hot forging causes a similar effect to annealing depending on the heating temperature.

"Uni-directionally hot rolling" means hot rolling which elongates the material in a single direction without hot rolling it in the direction 90 degrees tilted from that of the former hot rolling direction. (cross rolling). Note that, considering the ability of the hot rolling mill, it is also possible to hot roll the titanium alloy once, reheat it and further uni-directionally hot roll it or repeat the reheating and hot rolling several times.

The type of the hot rolling mill does not have to be particularly limited. From the viewpoint of avoiding a decrease in temperature of the hot rolled material during hot rolling, a tandem rolling mill, a reverse rolling mill, hot rolling mills consisting of these types in series or a Steckel rolling mill are preferable.

A connecting rod, in general, is mostly produced by forging a material. To reduce the load applied on the die during forging, a low forging load and a high shape precision of the forged product are demanded.

Figure 3:
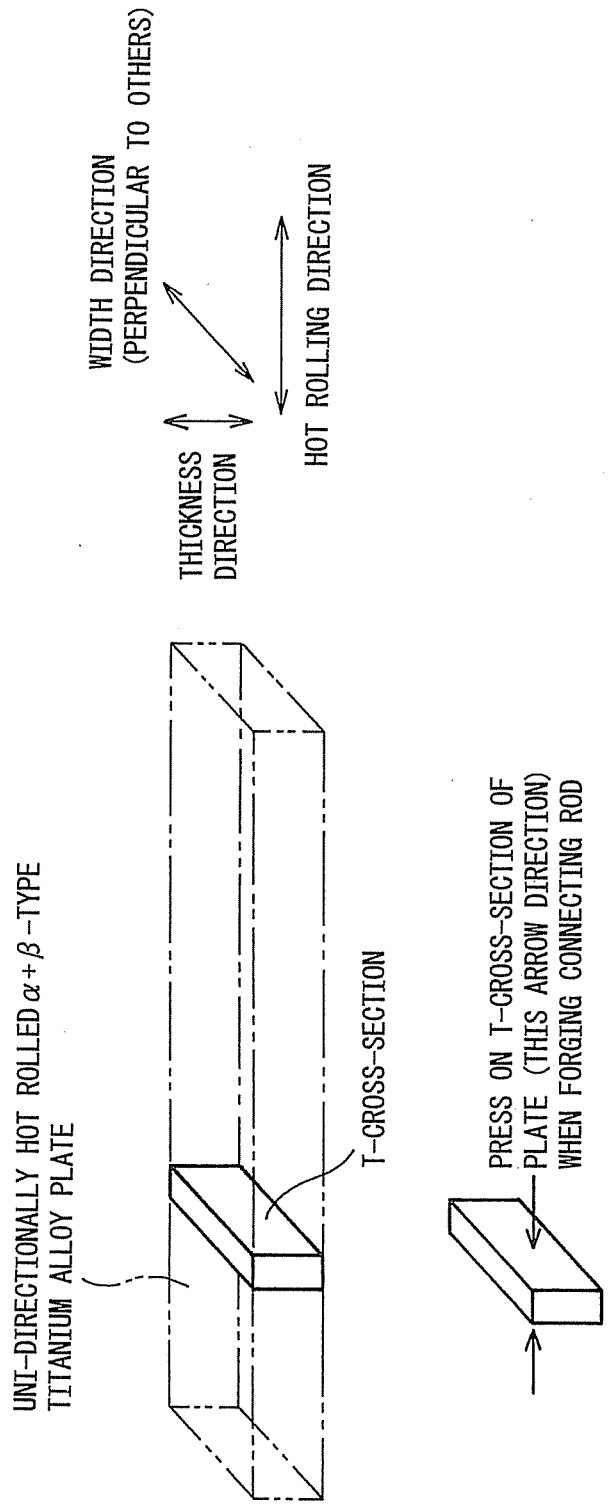
FIG. 3 is a schematic illustration which shows the relationship between the direction of an α+β-type titanium alloy plate which is uni-directionally hot rolled and that of a direction of compressive stress applied during forging when forging a connecting rod.

When an α+β-type titanium alloy plate, heated to the β-single phase region and uni-directionally hot rolled, is hot forged into a connecting rod in the case that the width direction of the hot rolled plate is set as the axial direction of the connecting rod, the forging load becomes about 10% lower and the shape precision after forging is improved when compressing the plate in the direction corresponding to the rolling direction of the plate as shown in FIG. 3 (T-cross-sectional side), compared with when compressing it from the top and bottom surfaces of it (thickness direction). In the former, the shape of the rounded corners becomes sharper after forging.

This is believed to be because there exist some α grains whose c-axes are aligned close to the normal of the plate in addition to a main crystal orientation in which c-axes of the α-phase are aligned to the width direction of the plate and the α-phase of the mixed orientations easily deforms when it is compressed in the same direction as that of the hot rolling.

From this viewpoint, in the method of production of a connecting rod of the present invention, an α+β-type titanium alloy is heated to the β-single phase region, uni-directionally hot rolled to a titanium alloy plate and then forged into a connecting rod with the width direction of the hot rolled plate corresponding to the axial direction of the connecting rod. During forging, the compression is preferably performed on the T-cross-sectional sides of the titanium alloy plate.

At this time, the forging has to be performed at a temperature lower than the β-transus. To keep the forging load low, forging at the temperature region from 200 to 850° C. is preferable.

If a part is machined in the way that the width direction of hot rolled α+β-type titanium alloy plate, which shows a high Young's modulus, corresponds to the direction of the part in which high rigidity is demanded, the high Young's modulus is maintained as it is.

Furthermore, even when the hot rolled plate is forged or hot-worked with other process causing some amount of plastic deformation, the high Young's modulus of the long axis direction is maintained. This is believed to be because during forging, even when either the top and bottom surfaces of the hot rolled plate (thickness direction) or T-cross-sectional sides of it is compressed, the compression direction is perpendicular to the width direction of the plate and the orientations of the c-axes of the α-phase match with the slip direction where slip deformation easily occurs, and it is possible to deform the plate without any change in the orientations of the c-axes and as a result even after forging, the high accumulation of the c-axes of α-grains in the width direction of the plate is maintained, leading to the high Young's modulus.

One of the advantageous effects of the present invention can be obtained in any α+β-type titanium alloy. For example, the advantageous effect of the present invention is achieved in typical α+β-type titanium alloys such as Ti-6Al-4V and Ti-3Al-2.5V.

On the other hand, in structural parts for motorcycles, cars, and bicycles, specifically, bolts, engine valves, and connecting rods, it is desirable to obtain stable material properties by adding more inexpensive alloying elements.

Therefore, the preferable chemical compositions of the α+β-type titanium alloy of the present invention are as follows: Below, "%" shall mean "mass %".

<Chemical Composition 1 of α+β-Type Titanium Alloy>

The chemical composition 1 of the α+β-type titanium alloy of the present invention contains Al: 0.5 to 5.5%, contains O and N in a total of 0.04 to 0.35%, further contains one or more of Fe, Cr, and Ni including Fe in a total of 0.5 to 2.5, and has a value of the following formula (1) of −2.0 to 5.3.

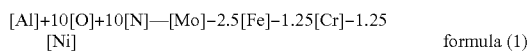

$$[Al]+10[O]+10[N]-[Mo]-2.5[Fe]-1.25[Cr]-1.25[Ni] \quad \text{formula (1)}$$

where [Al], [O], [N], [Mo], [Fe], [Cr], and [Ni] are respectively the concentrations (mass %) of Al, O, N, Mo, Fe, Cr, and Ni.

By employing such a chemical composition, it is possible to raise the Young's modulus in the width direction of a hot rolled plate to 130 GPa or more even without adding the expensive β-phase stabilizing element of V, for example.

In the α+β-type titanium alloy of the above chemical composition 1, a higher Young's modulus can be obtained than in Ti-6Al-4V or Ti-3Al-2.5V even under the same hot rolling conditions. This is believed to be because the addition of Fe, Cr, and Ni results in a higher Young's modulus in the c-axial direction of the hcp α-phase, higher accumulation of the orientation of c-axis in the width direction during hot rolling, and a higher Young's modulus of the β-phase, compared with the addition of V.

Al: 0.5 to 5.5%:

Al is an alloying element which stabilizes α-phase whose Young's modulus is higher than the β-phase. If the content of Al falls below 0.5%, it becomes difficult to raise the Young's modulus in the width direction during hot rolling. If the content of Al exceeds 5.5%, the maximum stress during hot deformation sometimes increases and defects including edge cracks easily occur during hot rolling. Therefore, the content of Al is made 0.5 to 5.5%.

Total of O and N: 0.04 to 0.35%:

If the total content of O and N exceeds 0.35%, together with the solid solution strengthening by Al or other elements, the material is hardened, and the ability to be drilled or to be cut by a lathe etc. falls, and the productivity drops. To make the total contents of O and N less than 0.04%, it is necessary to raise the purity of the materials used and the production cost rises. Therefore, the contents of O and N are made a total of 0.04 to 0.35%. Note that, even when neither O or N is deliberately added, usually this range of concentration is satisfied by the level of unavoidable impurities.

O and N, such as Al, are elements which stabilize the α-phase, but it is possible to stabilize the α-phase and raise the Young's modulus without causing a serious decrease in hot workability. From the viewpoint of the Young's modulus and the machinability, the total contents of O and N is preferably 0.12 to 0.30%. In the case that the concentrations of O and N are controlled in the above preferable range, it is possible to use relatively inexpensive materials, so this becomes advantageous in view of the production costs.

Total of Fe, Cr, and Ni: 0.5 to 2.5%

These elements, such as V, are β-phase stabilizing elements. They are inexpensive compared with V. However, Fe, Cr, and Ni are elements which are likely to segregate in the liquid phase (center of ingot) during solidification. If the contents of these elements exceed a total of 2.5%, solidification segregation sometimes affects the uniformity of the mechanical properties. For this reason, the contents of Fe, Cr, and Ni are a total of 2.5% or less.

As explained above, if an α+β-type titanium alloy material is uni-directionally hot rolled to a plate in the temperature region in which the β-phase is prevalent, the Young's modulus of the width direction of the plate becomes higher. When heating an α+β-type titanium alloy material to the temperature region of the single phase of β and uni-directionally hot rolling it, the temperature of the hot rolled material gradually decreases as the hot rolling process proceeds and the material is hot rolled in the α+β dual-phase region.

If the total concentration of the β stabilizing elements Fe, Cr, and Ni exceeds 0.5%, the temperature region in the α+β dual-phase region consisting of larger volume fraction of β-phase during hot rolling becomes broader. This is advantageous for raising the Young's modulus.

The point of the present invention is to hot roll the β-phase uni-directionally. The α-phase (hcp) obtained by transformation from the hot rolled β-phase (bcc) is believed to give a high Young's modulus in the width direction.

Furthermore, to obtain a high Young's modulus, it is preferable to keep the volume fraction of the β-phase low, which shows a low Young's modulus, so the total contents of the Fe, Cr, and Ni is preferably 1.7% or less.

Note that, among Fe, Cr, and Ni, Fe indicates the highest β-stabilizing ability. Further, Fe is the most inexpensive alloying element. Therefore, addition of Fe or two or more elements including Fe is preferable.

Value of formula (1): −2.0 to 5.3:

To raise the Young's modulus in the width direction, the balance of the β-phase which is hot rolled uni-directionally and causes the α-phase with high Young's modulus becomes important. The formula (1) is used as an indicator of the balance of the β-phase and the α-phase.

The formula (1) normalizes and totals the concentrations of the α-phase stabilizing elements (Al, O, N) as Al equivalents (=[Al]+10[O]+10[N]) and the concentrations of the β-phase stabilizing elements (Fe, Cr, Ni) as Mo equivalents ([Mo]+2.5[Fe]+1.25[Cr]+1.25[Ni]) and subtracts the Mo equivalents from the Al equivalents.

To establish the presence of the β-phase during hot rolling and to obtain the desired properties (high Young's modulus in the width direction), the total concentration of Fe, Cr, and Ni has to be at least 0.5% and the value of the formula (1) has to be in the range from −2.0 to 5.3.

If the value of the formula (1) is too low, the volume fraction of the β-phase with low Young's modulus becomes too high and a high Young's modulus cannot be obtained, but if the value of the formula (1) is −2.0 or more, a sufficiently high Young's modulus can be obtained.

On the other hand, if the value of the formula (1) exceeds 5.3, the volume fraction of β-phase in the high temperature range in the α+β dual-phase region decreases during hot rolling and the effect of raising the Young's modulus in the width direction cannot be sufficiently obtained.

To raise the Young's modulus, the value of the formula (1) is preferably 0.5 or more.

Note that, even in the case that Mo is not deliberately added, Mo is unavoidably contained in the alloy by about 0.002%. However, this is a negligible amount, so the formula (1) may also be used assuming Mo=0.

<Chemical Composition 2 of α+β-Type Titanium Alloy>

Next, the chemical composition 2 of the α+β-type titanium alloy of the present invention will be explained. The chemical composition 2 is an invention which decreases the effects of solidification segregation more and makes the melting and casting process easier by further addition of the β-phase stabilizing element, Mo, which tends to segregate in the solid state during solidification, which is reverse trend to Fe, Cr, and Ni, in order to raise the strength.

Fe, Cr, and Ni: 0.5 to 2.5%:

For similar reasons to the chemical composition 1, one or more of Fe, Cr, and Ni including Fe are added in a total of 0.5 to 2.5%.

Mo: 1.0 to 3.5%:

Fe, Cr, Ni, and Mo are all β-phase stabilizing elements. During solidification, at locations where the concentrations of Fe, Cr, and Ni are high, that of Mo becomes low. Conversely, at locations where the concentrations of Fe, Cr, and Ni are low, that of Mo becomes high.

That is, due to the addition of Mo, it is possible to make the balance of the α-phase and the β-phase (distribution of values of formula (1)) uniform in the bulk of a titanium alloy product.

The suitable concentration of Mo corresponding to the lower limit of 0.5% of the total concentration of Fe, Cr, and Ni is 1.0%, so the lower limit of the amount of addition of Mo is made 1.0%. Further, the suitable concentration of Mo corresponding to the upper limit of 2.5% of the total concentration of Fe, Cr, and Ni is 3.5%, so the upper limit of the amount of addition of Mo is made 3.5%.

Al: 2.5 to 5.5%:

To obtain a 900 MPa or higher tensile strength, which exceeds the tensile strength of Ti-3Al-2.5V, the concentration of Al is made a range of 2.5 to 5.5%. Preferably, it is 4.0 to 5.5% at which a 980 MPa or higher tensile strength is obtained as a strength characteristic equal to or greater than that of Ti-6Al-4V.

Furthermore, for similar reasons to the chemical composition 1, the total of the contents of O and N is made 0.04 to 0.35% and the value of the formula (1) is made the range of −2.0 to 5.3.

Even when not deliberately adding either of O and N, normally this range of concentration is satisfied by the level of unavoidable impurities. For similar reasons to the chemical composition 1, the preferable ranges are total contents of O and N of 0.12 to 0.30% and a value of the formula (1) of 0.5 to 5.3.

<Crystal Orientation of Shaped Part>

A bolt, connecting rod, or engine valve which is comprised of an α+β-type titanium alloy which is produced by the method of production of the present invention has a high Young's modulus in the width direction of the material, that is, the α+β-type titanium alloy plate which is hot rolled uni-directionally (125 GPa or more, preferably 130 GPa or more) and the long axis direction of these parts are machined to correspond to the width direction of the titanium alloy plate, so the Young's modulus (rigidity) in the long axis direction of the parts also becomes higher.

Further, an α+β-type titanium alloy part for a motorcycle, car, or bicycle which is produced by the method of production of the present invention is made from the α+β-type titanium alloy plate which is hot rolled uni-directionally, and is machined in the way that the width direction of the plate corresponds to the direction in which high rigidity is demanded in the finished part, so the Young's modulus (rigidity) in the direction where high rigidity is demanded in the finished part also becomes higher.

Figure 4:
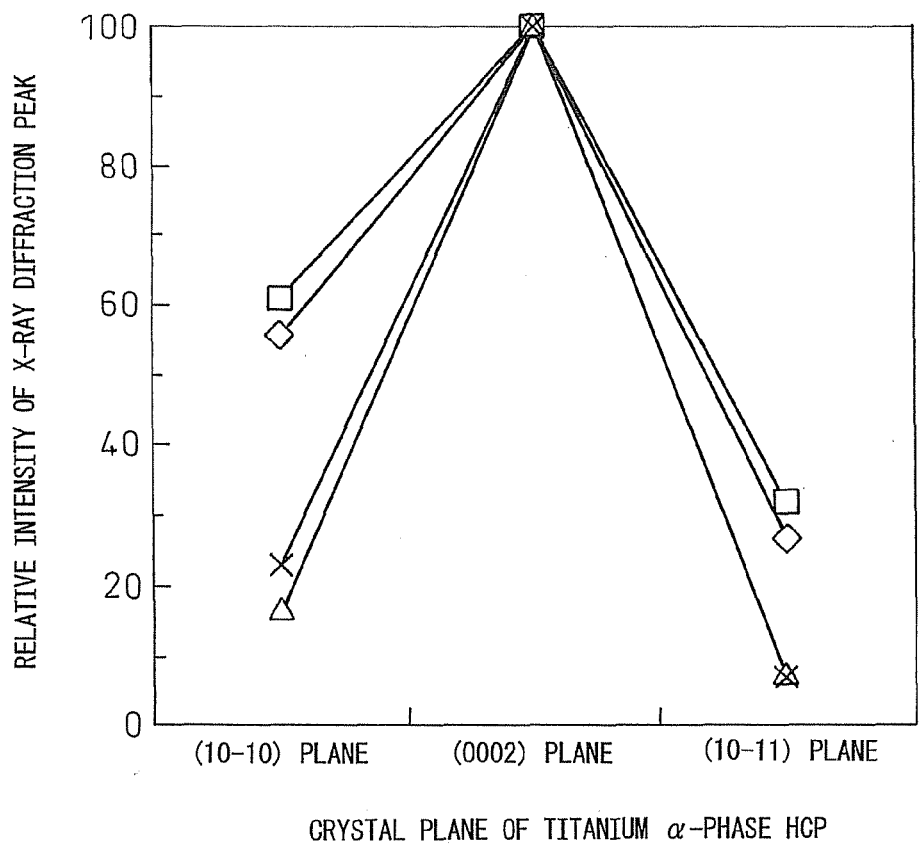
FIG. 4 is a figure which shows the relative magnitude of the X-ray diffraction intensities from different crystal planes in the titanium α-phase which are measured on a cross-section of the titanium alloy part vertical to the long axis direction which is produced by the present invention and the value of I(0002)/[I(10-10)+I(10-11)].

FIG. 4 shows the relationship of magnitude of the X-ray diffraction intensities from the crystal planes in the titanium α-phases, which were measured on the cross-sections vertical to the long axis directions (directions in which high rigidity is demanded) (cross-sections of broken line position of FIG. 2) in the finished products A, B, C, and D according to the present invention. The values of the following formula (2) are also shown at the side of the symbols in the figure.

$$I(0002)/[I(10\text{-}10)+I(10\text{-}11)] \quad \text{formula (2)}$$

The finished products A, B, C, and D all have strong X-ray diffraction intensities, I(0002), which were measured from the (0002) plane of the hcp α-phase. They are larger than the sum of the X-ray diffraction intensities from the (10-10) plane and the (10-11) plane of the hcp (I(10-10)+I(10-11)), that is, $I(0002)/[I(10\text{-}10)+I(10\text{-}11)] \leq 1$.

The values of the formula (2) of the finished products A, B, C, and D are 1.2, 1.1, 4.0, and 3.3, respectively.

The (0002) plane of the hcp α-phase is vertical to the c-axis. By comparing the X-ray diffraction intensity from the (0002) plane with the X-ray diffraction intensity from the other crystal planes, it is possible to quantitatively compare the degree of accumulation of the c-axes and that of the Young's modulus, since the Young's modulus in the direction parallel to the c-axis is the highest in titanium α-phase.

The feature of the present invention that $I(0002)/[I(10\text{-}10)+I(10\text{-}11)] \leq 1$ at the cross-section vertical to the long axis direction of the finished product means that the c-axes of the hcp are strongly accumulated in the long axis direction of the finished product.

On the other hand, when using a round bar which is produced by hot rolling as the material, the rolling direction corresponds to the longitudinal direction of the round bar, so the Young's modulus in the longitudinal direction of the round bar becomes a low value of 104 to 117 GPa. The X-ray diffraction intensities from the crystal planes vertical to the long axis directions of the finished products E, F, G, and H which were machined from such a round bar are shown in FIG. 5.

The finished products E, F, G, and H show weak X-ray diffraction intensities I(0002) from the (0002) planes of the hcp. They are smaller than the sum of the X-ray diffraction intensities from the (10-10) planes and the (10-11) planes of the hcp (I(10-10)+I(10-11)), that is, $I(0002)/[I(10\text{-}10)+I(10\text{-}11)]<0.2$. This is completely different from the characterizing feature of the present invention. The values of the formula (2) of the finished products E, F, G, and H are also shown at the sides of the symbols in the figure.

Figure 5:
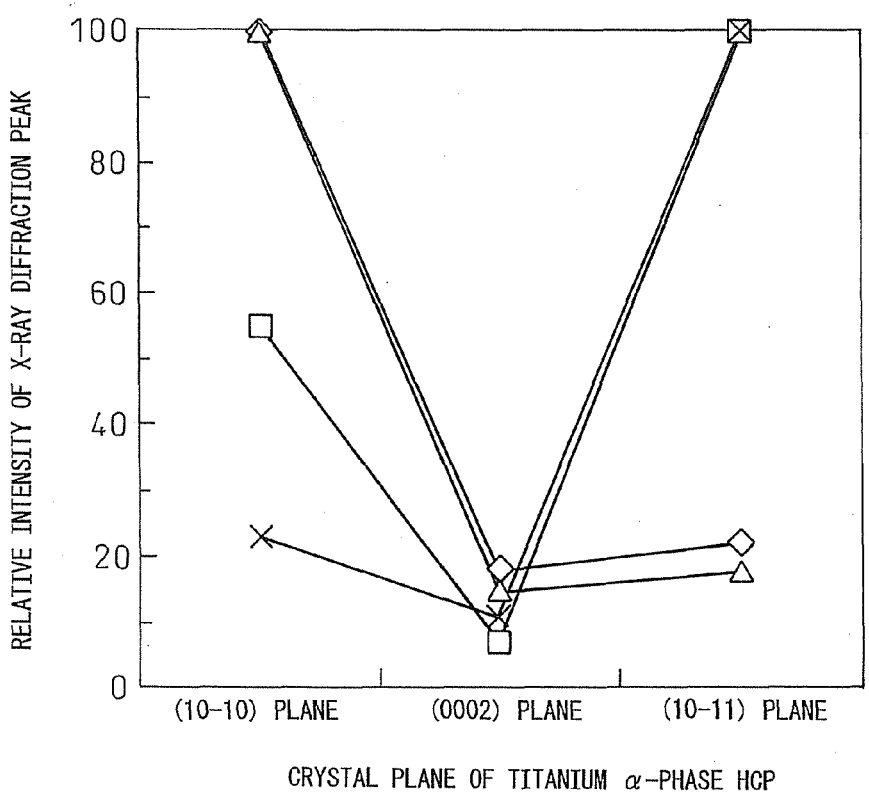
FIG. 5 is a figure which shows the relative magnitude of the X-ray diffraction intensities from different crystal planes in the titanium α-phase which are measured on a cross-section of the titanium alloy part vertical to the long axis direction which is produced by the conventional method and the value of I(0002)/[I(10-10)+I(10-11)].

The X-ray diffraction intensities which are shown in FIG. 4 and FIG. 5 are measured on the the cross-sections which are vertical to the long axis directions of the bolt, engine valve, and connecting rod (cross-sections of broken line positions in FIG. 2) by Cu vacuum tubes.

The value of the formula (2) is preferably 1.2 or more, more preferably 3.0 or more, since the stronger the accumulation of the c-axes, the higher the Young's modulus.

Furthermore, by controlling the chemical composition of the α+β-type titanium alloy to be made in the range of the above chemical composition 1 or chemical composition 2 of the above invention, the accumulation of the c-axes of hcp in the width direction of the plate is enhanced and then the Young's modulus in the width direction of the plate becomes higher.

INVENTION EXAMPLES 1

The α+β-type titanium alloy part of the present invention and the method of production of the same will be explained in further detail using the following invention examples.

As the materials, the five types of α+β-type titanium alloy ingots which are shown in Table 1 were heated at 1000 to 1150° C., hot forged to produce billets (100 mm in diameter) or slabs (150 mm in thickness) for hot rolling, and then hot rolled under the various conditions which are shown in Table 2 (A1 to A10) and Table 3 (B1 to B35) to produce round bars or plates.

Furthermore, the hot rolled round bars and plates were annealed under the conditions which are shown in Table 2 and Table 3. Note that, some parts among them were left in the unannealed state. The materials which are shown in Table 2 were hot rolled to round bars by the conventional caliver rolling process. The materials which are shown in Table 3 were hot rolled to plates.

The hot rolling to obtain plates using 150 mm-thick-slabs was performed by reduction in thickness of 60 to 90% which are shown in Table 3, while the thicknesses after hot rolling were 60 to 15 mm. The underlined values and conditions in Tables 3-5, 7 and 9 show values and conditions outside the scope of the present invention.

In Table 1, the values which are shown by Cr: 0.03% or less, Ni: 0.03% or less, Mo: 0.002% or less, N: 0.07% or less, and "−" show the normal levels of unavoidable impurities where these elements are not deliberately added. The same is true for Table 6 and Table 8. Note that, the concentration of Fe unavoidably contained is 0.03 to 0.07% or so.

The materials listed in Table 2 and Table 3 were machined for round bars and some of the bars were thread rolled subsequently. Also, the materials in Table 2 and Table 3 were hot forged by compressing them with flat plates from the top and bottom and were hot forged with dies simulating connecting rods. The values of the Young's modulus in the long axis direction and the values of the formula (2) which were measured on the cross-sections vertical to the long axis direction are shown in Table 4 and Table 5.

Furthermore, the directions cut from the materials by machining (the directions of the materials that are parallel to the long axis directions of the finished products) and the tensile strengths of the machined round bars are also shown in Table 4 and Table 5.

As machined round bars simulating the stem parts of engine valves and the same which were thread rolled simulating bolts and parts which were hot forged using dies simulating connecting rods were prepared.

Note that, as machined round bars and the same which were thread rolled showed little difference in tensile strengths, Young's moduli, and values of the formula (2), so the values are given as single values for "round bars and bars thread rolled".

Cold thread rolling was carried out to produce bolts.

Hot forging with flat plates was performed after reheating the materials at 700° C. with a reduction in diameter of round bars or in thickness of plates by 50%.

Hot forging using dies simulating connecting rods was performed by heating the materials at around 800° C. to facilitate the metal flow and pressing the plates in the thickness direction and the rounds bars in the diametrical direction.

In addition, in the invention examples which are shown in Table 5, hot forging using flat plates for compressing the materials from the top and bottom was performed for both the case of pressing the plates in the thickness directions (abbreviation "T") and the case of pressing the plates in the longitudinal directions (abbreviation "L") and the magnitudes of the maximum loads during hot forging were compared.

Tensile strength was measured by tensile test specimens with a gauge diameter of 6.25 mm and a gauge length of 32 mm which were machined from the materials and tensile tests were conducted at room temperature.

The Young's modulus was measured with a free holding type measurement device by the resonance method at room temperature and test specimens of 10 mm in width, 1.5 mm in thickness, and 60 mm in length were used.

The value of the formula (2) was calculated by the relative intensities of the X-ray diffraction peaks from (0002) plane, (10-10) plane, and (10-11) plane in the hcp titanium α-phase, obtained by X-ray diffraction conducted on the cross-section vertical to the long axis direction of the materials, by using a Cu vacuum tube.

TABLE 1

| Abbreviation of α + β-type titanium alloy | Chemical composition (mass %) | | | | | | | | Value of formula (1) | β-transus (° C.) |
|---|---|---|---|---|---|---|---|---|---|---|
| | Al | V | Fe | Cr | Ni | Mo | O | N | | |
| Ti—6Al—4V | 6.02 | 3.9 | — | — | — | — | — | — | — | 990 |
| Ti—3Al—2.5V | 3.01 | 2.45 | — | — | — | — | — | — | — | 935 |
| Ti—1Fe—0.35O | 0.01 | — | 0.98 | 0.01 | 0.01 | — | 0.34 | 0.009 | — | 935 |
| Ti—5Al—1Fe | 5.10 | 0.003 | 1.07 | 0.02 | 0.02 | 0.002 | 0.16 | 0.003 | 4.0 | 1010 |
| Ti—5Al—2Fe—3Mo | 5.10 | 0.003 | 1.90 | 0.02 | 0.02 | 3.1 | 0.17 | 0.004 | −1.1 | 955 |

TABLE 2

| | | Hot rolling conditions to round bar | | | | |
|---|---|---|---|---|---|---|
| No. | Material | Heating temperature ° C. | Rolling direction (uni-directionally) | Reduction in area % | Annealing conditions | Remarks |
| A1 | Ti—6Al—4V | 900 | Caliver rolling | 96 | 750° C./1 hour/air cooled | Material of comparative examples |
| A2 | " | 1050 | Caliver rolling | 96 | 750° C./1 hour/air cooled | |
| A3 | Ti—3Al—2.5V | 900 | Caliver rolling | 96 | 750° C./1 hour/air cooled | |
| A4 | " | 1050 | Caliver rolling | 96 | 750° C./1 hour/air cooled | |
| A5 | Ti—1Fe—0.35O | 900 | Caliver rolling | 96 | 750° C./1 hour/air cooled | |
| A6 | " | 1050 | Caliver rolling | 96 | 750° C./1 hour/air cooled | |
| A7 | Ti—5Al—1Fe | 900 | Caliver rolling | 96 | 750° C./1 hour/air cooled | |
| A8 | " | 1050 | Caliver rolling | 96 | 750° C./1 hour/air cooled | |
| A9 | Ti—5Al—2Fe—3Mo | 900 | Caliver rolling | 96 | 750° C./1 hour/air cooled | |
| A10 | " | 1050 | Caliver rolling | 96 | 750° C./1 hour/air cooled | |

TABLE 3

| No. | Material | Hot rolling condition to plate | | | Annealing condition temp./holding time/cooling | Remarks |
|---|---|---|---|---|---|---|
| | | Heating temp. °C. | Rolling direction #1 | Reduction in thickness % | | |
| B1 | Ti—6Al—4V | 1050 | Uni-directionally | 90 | 750° C./1 hour/air cooled | Material of invention examples |
| B2 | " | 1050 | Uni-directionally | 60 | 750° C./1 hour/air cooled | |
| B3 | " | 1050 | Uni-directionally | 80 | 750° C./1 hour/air cooled | |
| B4 | " | 1100 | Uni-directionally | 80 | 750° C./1 hour/air cooled | |
| B5 | " | 1050 | Uni-directionally | 80 | No annealing | |
| B6 | Ti—3Al—2.5V | 1000 | Uni-directionally | 90 | 750° C./1 hour/air cooled | |
| B7 | " | 1000 | Uni-directionally | 60 | 750° C./1 hour/air cooled | |
| B8 | " | 1000 | Uni-directionally | 80 | 750° C./1 hour/air cooled | |
| B9 | " | 1050 | Uni-directionally | 80 | 750° C./1 hour/air cooled | |
| B10 | " | 1000 | Uni-directionally | 80 | No annealing | |
| B11 | Ti—1Fe—0.35O | 1000 | Uni-directionally | 90 | 750° C./1 hour/air cooled | |
| B12 | " | 1000 | Uni-directionally | 60 | 750° C./1 hour/air cooled | |
| B13 | " | 1000 | Uni-directionally | 80 | 750° C./1 hour/air cooled | |
| B14 | " | 1050 | Uni-directionally | 80 | 750° C./1 hour/air cooled | |
| B15 | " | 1000 | Uni-directionally | 80 | No annealing | |
| B16 | Ti—5Al—1Fe | 1050 | Uni-directionally | 90 | 750° C./1 hour/air cooled | |
| B17 | " | 1050 | Uni-directionally | 60 | 750° C./1 hour/air cooled | |
| B18 | " | 1050 | Uni-directionally | 80 | 750° C./1 hour/air cooled | |
| B19 | " | 1100 | Uni-directionally | 80 | 750° C./1 hour/air cooled | |
| B20 | " | 1050 | Uni-directionally | 80 | No annealing | |
| B21 | Ti—5Al—2Fe—3Mo | 1000 | Uni-directionally | 90 | 750° C./1 hour/air cooled | |
| B22 | " | 1000 | Uni-directionally | 60 | 750° C./1 hour/air cooled | |
| B23 | " | 1000 | Uni-directionally | 80 | 750° C./1 hour/air cooled | |
| B24 | " | 1050 | Uni-directionally | 80 | 750° C./1 hour/air cooled | |
| B25 | " | 1000 | Uni-directionally | 80 | No annealing | |
| B26 | Ti—6Al—4V | 950 | Uni-directionally | 80 | 750° C./1 hour/air cooled | Material of comparative examples |
| B27 | Ti—3Al—2.5V | 900 | Uni-directionally | 80 | 750° C./1 hour/air cooled | |
| B28 | Ti—1Fe—0.35O | 900 | Uni-directionally | 80 | 750° C./1 hour/air cooled | |
| B29 | Ti—5Al—1Fe | 950 | Uni-directionally | 80 | 750° C./1 hour/air cooled | |
| B30 | Ti—5Al—2Fe—3Mo | 900 | Uni-directionally | 80 | 750° C./1 hour/air cooled | |
| B31 | Ti—6Al—4V | 950 | Cross | 80 | 750° C./1 hour/air cooled | |
| B32 | Ti—3Al—2.5V | 900 | Cross | 80 | 750° C./1 hour/air cooled | |
| B33 | Ti—1Fe—0.35O | 900 | Cross | 80 | 750° C./1 hour/air cooled | |
| B34 | Ti—5Al—1Fe | 950 | Cross | 80 | 750° C./1 hour/air cooled | |
| B35 | Ti—5Al—2Fe—3Mo | 900 | Cross | 80 | 750° C./1 hour/air cooled | |

1. Rolling direction: [1] "Uni-directionally" indicates rolling uni-directionally until predetermined thickness without changing rolling direction after heating. [2] "Cross" indicates rolling from thickness 150 mm to 75 mm after heating (draft 50%), then changing rolling direction by 90 degrees and further rolling down to thickness 30 mm.
2. Width direction of plate: Direction intersecting final hot rolling direction by 90 degrees defined as width direction. (Direction perpendicular to both final hot rolling direction and thickness direction)

TABLE 4

| No. | Material used | Direction of material parallel to longitudinal axis direction of round bar and hot forged part (reference direction) | Round bar material Round bar and thread rolled bar | | | Method of hot forging of material | | | | |
|---|---|---|---|---|---|---|---|---|---|---|
| | | | | | | Hot forged in diameter direction of round bar or thickness direction of plate | | Hot forged by die simulating connecting rod (shaft part) | | |
| | | | Tensile strength MPa | Young's modulus GPa | Value of formula (2) | Young's modulus GPa | Value of formula (2) | Young's modulus GPa | Value of formula (2) | Remarks |
| V1 | A1 | Round bar longitudinal direction | 980 | 117 | 0.13 | 117 | 0.15 | 116 | 0.13 | Comp. ex. |
| V2 | A2 | Round bar longitudinal direction | 978 | 116 | 0.04 | 117 | 0.05 | 115 | 0.04 | Comp. ex. |
| V3 | A3 | Round bar longitudinal direction | 723 | 112 | 0.04 | 113 | 0.05 | 112 | 0.04 | Comp. ex. |
| V4 | A4 | Round bar longitudinal direction | 720 | 113 | 0.03 | 113 | 0.03 | 112 | 0.03 | Comp. ex. |
| V5 | A5 | Round bar longitudinal direction | 807 | 108 | 0.03 | 109 | 0.04 | 108 | 0.03 | Comp. ex. |
| V6 | A6 | Round bar longitudinal direction | 804 | 110 | 0.04 | 109 | 0.04 | 109 | 0.04 | Comp. ex. |
| V7 | A7 | Round bar longitudinal direction | 912 | 116 | 0.11 | 115 | 0.13 | 115 | 0.11 | Comp. ex. |
| V8 | A8 | Round bar longitudinal direction | 912 | 115 | 0.09 | 114 | 0.09 | 114 | 0.09 | Comp. ex. |
| V9 | A9 | Round bar longitudinal direction | 1081 | 106 | 0.07 | 106 | 0.08 | 106 | 0.07 | Comp. ex. |
| V10 | A10 | Round bar longitudinal direction | 1077 | 104 | 0.06 | 105 | 0.07 | 104 | 0.06 | Comp. ex. |
| V11 | B26 | Plate width direction | 991 | 117 | 0.14 | 117 | 0.15 | 116 | 0.14 | Comp. ex. |
| V12 | B27 | Plate width direction | 731 | 116 | 0.08 | 116 | 0.10 | 116 | 0.08 | Comp. ex. |
| V13 | B28 | Plate width direction | 942 | 114 | 0.09 | 113 | 0.09 | 113 | 0.09 | Comp. ex. |
| V14 | B29 | Plate width direction | 989 | 120 | 0.22 | 119 | 0.22 | 119 | 0.22 | Comp. ex. |
| V15 | B30 | Plate width direction | 1056 | 116 | 0.30 | 115 | 0.29 | 115 | 0.29 | Comp. ex. |
| V16 | B31 | Plate width direction | 984 | 108 | 0.02 | 107 | 0.04 | 107 | 0.02 | Comp. ex. |
| V17 | B32 | Plate width direction | 721 | 106 | 0.02 | 106 | 0.03 | 105 | 0.02 | Comp. ex. |
| V18 | B33 | Plate width direction | 833 | 107 | 0.03 | 107 | 0.03 | 107 | 0.03 | Comp. ex. |
| V19 | B34 | Plate width direction | 973 | 108 | 0.05 | 109 | 0.07 | 108 | 0.05 | Comp. ex. |
| V20 | B35 | Plate width direction | 1012 | 106 | 0.05 | 107 | 0.06 | 106 | 0.05 | Comp. ex. |
| V21 | B26 | Plate longitudinal direction | 965 | 107 | 0.03 | 107 | 0.03 | 107 | 0.03 | Comp. ex. |
| V22 | B29 | Plate longitudinal direction | 946 | 110 | 0.10 | 111 | 0.11 | 110 | 0.10 | Comp. ex. |
| V23 | B31 | Plate longitudinal direction | 979 | 108 | 0.02 | 109 | 0.03 | 108 | 0.02 | Comp. ex. |
| V24 | B34 | Plate longitudinal direction | 978 | 108 | 0.05 | 108 | 0.05 | 108 | 0.05 | Comp. ex. |

TABLE 5

| No. | Material used | Direction of material parallel to longitudinal axis direction of round bar and hot forged part (reference direction) | Round bar cut from material Round bar and thread rolled bar | | Hot forged part of material | | | | | | | |
|---|---|---|---|---|---|---|---|---|---|---|---|---|
| | | | | | Hot forged in thickness direction of plate (T) | | Hot forged in longitudinal direction of plate (L) | | Rel. magnitude of max. load during hot forging #1 | Hot forging by die simulating connecting rod (shaft part) | | |
| | | | Tensile strength MPa | Young's modulus GPa | Young's modulus GPa | Value of formula (2) | Young's modulus GPa | Value of formula (2) | Young's modulus GPa | Value of formula (2) | | Young's modulus GPa | Value of formula (2) | Remarks |
| W1 | B1 | Plate width dir. | 1010 | 128 | 1.2 | 129 | 1.2 | 128 | 1.2 | T > L | 128 | 1.2 | Inv. ex. (1) |
| W2 | B2 | Plate width dir. | 998 | 125 | 1.0 | 125 | 1.0 | 126 | 1.1 | T > L | 125 | 1.0 | Inv. ex. (1) |
| W3 | B3 | Plate width dir. | 1001 | 126 | 1.1 | 126 | 1.1 | 125 | 1.0 | T > L | 126 | 1.1 | Inv. ex. (1) |
| W4 | B4 | Plate width dir. | 998 | 125 | 1.0 | 125 | 1.0 | 125 | 1.0 | T > L | 125 | 1.0 | Inv. ex. (1) |
| W5 | B5 | Plate width dir. | 1082 | 128 | 1.2 | 129 | 1.3 | 129 | 1.3 | T > L | 129 | 1.2 | Inv. ex. (1) |
| W6 | B6 | Plate width dir. | 746 | 128 | 1.2 | 129 | 1.2 | 128 | 1.2 | T > L | 128 | 1.2 | Inv. ex. (1) |
| W7 | B7 | Plate width dir. | 734 | 126 | 1.1 | 126 | 1.1 | 126 | 1.1 | T > L | 126 | 1.1 | Inv. ex. (1) |
| W8 | B8 | Plate width dir. | 744 | 127 | 1.1 | 127 | 1.1 | 127 | 1.1 | T > L | 127 | 1.1 | Inv. ex. (1) |
| W9 | B9 | Plate width dir. | 736 | 126 | 1.1 | 127 | 1.1 | 126 | 1.1 | T > L | 126 | 1.1 | Inv. ex. (1) |
| W10 | B10 | Plate width dir. | 825 | 128 | 1.2 | 129 | 1.2 | 129 | 1.2 | T > L | 129 | 1.2 | Inv. ex. (1) |
| W11 | B11 | Plate width dir. | 972 | 129 | 2.0 | 128 | 1.9 | 129 | 2.0 | T > L | 129 | 2.0 | Inv. ex. (1) |
| W12 | B12 | Plate width dir. | 962 | 126 | 1.1 | 126 | 1.1 | 125 | 1.1 | T > L | 126 | 1.1 | Inv. ex. (1) |

TABLE 5-continued

| | | Direction of material parallel to longitudinal axis direction of round bar and hot forged part (reference direction) | Round bar cut from material Round bar and thread rolled bar | | | Hot forged part of material | | | | | | | |
|---|---|---|---|---|---|---|---|---|---|---|---|---|---|
| | | | | | | Hot forged in thickness direction of plate (T) | | Hot forged in longitudinal direction of plate (L) | | Rel. magnitude of max. load | Hot forging by die simulating connecting rod (shaft part) | | |
| No. | Material used | | Tensile strength MPa | Young's modulus GPa | Value of formula (2) | Young's modulus GPa | Value of formula (2) | Young's modulus GPa | Value of formula (2) | during hot forging #1 | Young's modulus GPa | Value of formula (2) | Remarks |
| W13 | B13 | Plate width dir. | 969 | 128 | 1.2 | 128 | 1.2 | 128 | 1.2 | T > L | 128 | 1.2 | Inv. ex. (1) |
| W14 | B14 | Plate width dir. | 965 | 126 | 1.1 | 127 | 1.1 | 128 | 1.2 | T > L | 127 | 1.1 | Inv. ex. (1) |
| W15 | B15 | Plate width dir. | 1037 | 129 | 2.0 | 129 | 2.1 | 129 | 2.0 | T > L | 129 | 2.0 | Inv. ex. (1) |
| W16 | B16 | Plate width dir. | 1027 | 139 | 4.0 | 139 | 4.0 | 140 | 4.0 | T > L | 139 | 4.0 | Inv. ex. (2) |
| W17 | B17 | Plate width dir. | 1012 | 137 | 3.1 | 137 | 3.1 | 136 | 3.1 | T > L | 137 | 3.1 | Inv. ex. (2) |
| W18 | B18 | Plate width dir. | 1022 | 139 | 3.3 | 138 | 3.3 | 138 | 3.2 | T > L | 138 | 3.3 | Inv. ex. (2) |
| W19 | B19 | Plate width dir. | 1020 | 138 | 3.2 | 138 | 3.2 | 139 | 3.3 | T > L | 138 | 3.2 | Inv. ex. (2) |
| W20 | B20 | Plate width dir. | 1097 | 140 | 4.0 | 140 | 4.0 | 140 | 4.0 | T > L | 140 | 4.0 | Inv. ex. (2) |
| W21 | B21 | Plate width dir. | 1193 | 132 | 3.1 | 132 | 3.1 | 133 | 3.2 | T > L | 132 | 3.1 | Inv. ex. (3) |
| W22 | B22 | Plate width dir. | 1184 | 130 | 3.0 | 131 | 3.0 | 131 | 3.1 | T > L | 131 | 3.0 | Inv. ex. (3) |
| W23 | B23 | Plate width dir. | 1190 | 131 | 3.0 | 131 | 3.0 | 132 | 3.1 | T > L | 131 | 3.1 | Inv. ex. (3) |
| W24 | B24 | Plate width dir. | 1183 | 130 | 3.0 | 131 | 3.1 | 131 | 3.1 | T > L | 131 | 3.0 | Inv. ex. (3) |
| W25 | B25 | Plate width dir. | 1258 | 133 | 3.1 | 133 | 3.1 | 132 | 3.1 | T > L | 133 | 3.1 | Inv. ex. (3) |
| W26 | B3 | Plate long. dir. | 978 | 106 | 0.02 | 108 | 0.04 | | | | 107 | 0.03 | Comp. ex. |
| W27 | B8 | Plate long. dir. | 688 | 108 | 0.03 | 108 | 0.04 | | | | 108 | 0.04 | Comp. ex. |
| W28 | B13 | Plate long. dir. | 691 | 111 | 0.06 | 112 | 0.07 | | | | 112 | 0.07 | Comp. ex. |
| W29 | B18 | Plate long. dir. | 967 | 112 | 0.08 | 112 | 0.09 | | | | 112 | 0.09 | Comp. ex. |
| W30 | B23 | Plate long. dir. | 1112 | 109 | 0.05 | 109 | 0.01 | | | | 109 | 0.03 | Comp. ex. |

1: Shows relative magnitude of the maximum load when hot forged from the thickness direction of the plate (abbreviation "T") and when hot forged from the long direction of the plate (abbreviation "L").

V1 to V10 of Table 4 used round bar materials A1 to A10 of Table 2, which were prepared by the conventional hot rolling process. Each of the finished parts had a Young's modulus of 117 GPa or less and a value of the formula (2) of a low 0.15 or less.

V11 to V24 of Table 4 used plate materials B26 to B35 of Table 2, which were prepared by uni-directionally hot rolling or cross rolling after heated at temperatures of less than the β-transus Each of the finished parts had a Young's modulus of 120 GPa or less and a value of the formula (2) of a low 0.30 or less or not that much different from the case of using a round bar which was produced by hot rolling. V21 to V24 are examples of production of worked parts from the materials of the plates of B26, B29, B31, and B34 so that the longitudinal directions (hot rolling directions) of the plates corresponded to the long axis directions of the finished products.

The W1 to W25 of the Invention Examples (1), Invention Examples (2), and Invention Examples (3) of Table 5 are examples of production of finished parts from the plates which were produced by heating to the β-single phase region exceeding the β-tranus, and by uni-directionally hot rolling, that is, the materials B1 to B25 of Table 3 were machined in the way that the width directions of the plates corresponded to the long axis directions of the finished parts.

Each of the finished parts had a Young's modulus of 125 GPa or more and a value of the formula (2) of a high 1.0 or more. It is obvious that W16 to W25 of the Invention Examples (2) and Invention Examples (3) using Ti-5Al-1Fe and Ti-5Al-2Fe-3Mo of Table 1 had Young's moduli of further higher 130 to 140 GPa.

In this way, according to the method of production of the present invention, it is possible to raise the Young's modulus (rigidity) in the long axis direction of an α+β-type titanium alloy part and obtain the characteristic of I(0002)/[I(10-10)+ I(10-11)]≤1 on the cross-section vertical to the long axis direction.

W26 to W30 of Table 5 are finished parts which were produced from the plate materials of B3, B8, B13, B18, and B23 so that the longitudinal directions of the plates (hot rolling direction), different in direction by 90 degrees from the above invention examples, corresponded to the long axis directions. The Young's moduli of the finished parts failed to reach 120 GPa and the values of the formula (2) were also less than 0.1.

INVENTION EXAMPLES 2

The chemical composition 1 of the α+β-type titanium alloy of the present invention will be explained in further detail using the following invention examples.

α+β-type titanium alloy ingots comprised of the alloying elements not including Mo of C1 to C21 which are shown in Table 6 were hot forged to produce 40 mm-thick-slabs. These were heated at temperatures in the β-single phase region exceeding the β-transus, and then were uni-directionally hot rolled to produce 10 mm-thick-plates (reduction in thickness of 75%).

After that, the hot rolled plates were annealed at 750° C. for 1 hour and air cooled.

During uni-directionally hot rolling, to heat the slabs in the β-single phase region, materials whose β-transus estimated from formula (3) were 970° C. to 1019° C. were heated at 1050° C., while those whose β-transus were lower than 970° C. were heated at 1000° C. (See rightmost column of Table 6)

In C1 to C21 shown in Table 6, Mo is not added deliberately, but they unavoidably contain 0.002% of Mo, so that value is entered in Table 6.

Estimated β-transus (° C.)=20.6[Al]−18[Fe]−16.7[Cr]−16.7[Ni]−10.3[Mo]+122[O]+150[N]+895.5   formula (3)

where, [Al], [Fe], [Cr], [Ni], [Mo], [O], and [N] are respectively the concentrations (mass %) of Al, Fe, Cr, Ni, Mo, O, and N.

The formula (3) is based on the formula described in the Iron and Steel Institute of Japan, "Tetsu-to-Hagane" (Vol. 75, No. 5, 1987), S-704, "Determination of β-Transus of Titanium Alloy by Electrical Resistance Measurement Method and Establishment of Formula for Estimation of β-Transus". Coefficients of Ni and N which were not included in the above document were estimated from the binary phase diagram of Ti—Ni system and that of Ti—N system.

β-transus estimated by the formula (3) for 10 or more alloys which contained alloying elements within the range of the chemical composition defined by the present invention matched well with the β-transus measured during heating the alloys by differential thermal analyzer and the difference between the estimated temperature and the measured one was less than 5° C.

Table 7 shows the Young's modulus in the long axis direction and the values of the formula (2) measured on the cross-section vertical to the long axis direction of round bars machined from the materials comprised of the alloying elements indicated in Table 6 and prepared by the above procedures and those of bars of the same thread rolled and those of hot forged parts compressed by flat plates from the top and bottom. Furthermore, Table 7 shows the tensile strengths of the machined round bars.

The tensile strengths, Young's moduli, and the values of the formula (2) were measured by the same procedures as explained above.

Cold thread rolling was carried out to obtain bolts.

Hot forging using flat plates to compress the materials from the top and bottom was performed for both the case of pressing the plates in the thickness directions (abbreviation "T") and the case of pressing the plates in the longitudinal directions (abbreviation "L") and the magnitudes of the maximum loads during hot forging were compared.

Hot forging with flat plates from the top and bottom was performed after the materials had been heated at 700° C. with a reduction in thickness of 50%.

TABLE 6

| No. | Chemical composition (mass %) | | | | | | | | | Value of formula (1) | Estimated β-transus (° C.) |
| | Al | Fe | Cr | Ni | Mo | O | N | [O] + [N] | [Fe] + [Cr] + [Ni] | | |
| --- | --- | --- | --- | --- | --- | --- | --- | --- | --- | --- | --- |
| C1 | 0.11 | 0.28 | 0.02 | 0.02 | 0.002 | 0.05 | 0.003 | 0.05 | 0.3 | −0.1 | 899 |
| C2 | 0.52 | 1.52 | 0.02 | 0.02 | 0.002 | 0.05 | 0.003 | 0.05 | 1.6 | −2.8 | 885 |
| C3 | 0.50 | 0.40 | 0.10 | 0.11 | 0.002 | 0.04 | 0.003 | 0.04 | 0.6 | −0.3 | 900 |
| C4 | 1.01 | 0.49 | 0.02 | 0.02 | 0.002 | 0.12 | 0.005 | 0.13 | 0.5 | 1.0 | 922 |
| C5 | 1.02 | 0.49 | 0.02 | 0.02 | 0.002 | 0.27 | 0.080 | 0.35 | 0.5 | 3.2 | 952 |
| C6 | 1.02 | 1.01 | 0.12 | 0.10 | 0.002 | 0.11 | 0.006 | 0.12 | 1.2 | −0.6 | 909 |
| C7 | 1.02 | 1.50 | 0.10 | 0.12 | 0.002 | 0.10 | 0.004 | 0.10 | 1.7 | −2.0 | 899 |
| C8 | 2.52 | 1.00 | 0.03 | 0.02 | 0.002 | 0.12 | 0.006 | 0.13 | 1.1 | 1.2 | 944 |
| C9 | 2.99 | 0.50 | 0.02 | 0.02 | 0.002 | 0.07 | 0.004 | 0.07 | 0.5 | 2.4 | 957 |
| C10 | 3.02 | 0.98 | 0.22 | 0.10 | 0.002 | 0.12 | 0.006 | 0.13 | 1.3 | 1.4 | 950 |
| C11 | 3.02 | 1.02 | 0.02 | 0.09 | 0.002 | 0.26 | 0.010 | 0.27 | 1.1 | 3.0 | 971 |
| C12 | 2.99 | 2.06 | 0.11 | 0.10 | 0.002 | 0.13 | 0.005 | 0.14 | 2.3 | −1.1 | 933 |
| C13 | 5.10 | 0.48 | 0.10 | 0.02 | 0.002 | 0.22 | 0.012 | 0.23 | 0.6 | 6.1 | 1019 |
| C14 | 5.02 | 0.53 | 0.53 | 0.02 | 0.002 | 0.17 | 0.004 | 0.17 | 1.1 | 4.7 | 1002 |
| C15 | 5.04 | 0.09 | 0.91 | 0.02 | 0.002 | 0.13 | 0.004 | 0.13 | 1.0 | 5.0 | 999 |
| C16 | 5.03 | 1.02 | 0.02 | 0.02 | 0.002 | 0.08 | 0.005 | 0.09 | 1.1 | 3.3 | 991 |
| C17 | 5.03 | 1.02 | 0.02 | 0.02 | 0.002 | 0.27 | 0.007 | 0.28 | 1.1 | 5.2 | 1014 |
| C18 | 5.05 | 1.94 | 0.24 | 0.25 | 0.002 | 0.15 | 0.006 | 0.16 | 2.4 | 1.1 | 976 |
| C19 | 5.48 | 1.50 | 0.02 | 0.02 | 0.002 | 0.16 | 0.004 | 0.16 | 1.5 | 3.3 | 1001 |
| C20 | 5.47 | 1.97 | 0.02 | 0.02 | 0.002 | 0.17 | 0.004 | 0.17 | 2.0 | 2.2 | 993 |
| C21 | 5.47 | 0.99 | 0.26 | 0.25 | 0.002 | 0.15 | 0.006 | 0.16 | 1.5 | 3.9 | 1001 |

TABLE 7

| | | Round bar | | | | Hot forged part | | | | | |
| | | Direction of material parallel to long axis direction of round bar and hot forged part (reference direction) | Round bar and thread rolled bar | | | Hot forged in the thickness direction of plate (T) | | Hot forged in the longitudinal direction of plate (L) | | Comparison of magnitude of maximum load during hot forging#1 | |
| No. | Material used | | Tensile strength MPa | Young's modulus GPa | Value of formula (2) | Young's modulus GPa | Value of formula (2) | Young's modulus GPa | Value of formula (2) | | Remarks |
| --- | --- | --- | --- | --- | --- | --- | --- | --- | --- | --- | --- |
| X1 | C3 | Plate width dir. | 665 | 131 | 3.1 | 132 | 3.1 | 131 | 3.1 | T > L | Inv. ex.(2) |
| X2 | C4 | Plate width dir. | 732 | 136 | 3.3 | 135 | 3.3 | 135 | 3.3 | T > L | Inv. ex.(2) |
| X3 | C5 | Plate width dir. | 869 | 137 | 3.4 | 137 | 3.4 | 136 | 3.4 | T > L | Inv. ex.(2) |
| X4 | C6 | Plate width dir. | 786 | 133 | 3.2 | 133 | 3.2 | 134 | 3.3 | T > L | Inv. ex.(2) |
| X5 | C7 | Plate width dir. | 820 | 130 | 3.0 | 131 | 3.1 | 131 | 3.1 | T > L | Inv. ex.(2) |
| X6 | C8 | Plate width dir. | 850 | 135 | 3.4 | 135 | 3.3 | 136 | 3.4 | T > L | Inv. ex.(2) |
| X7 | C9 | Plate width dir. | 799 | 136 | 3.4 | 135 | 3.4 | 136 | 3.4 | T > L | Inv. ex.(2) |
| X8 | C10 | Plate width dir. | 896 | 137 | 3.4 | 137 | 3.4 | 137 | 3.4 | T > L | Inv. ex.(2) |
| X9 | C11 | Plate width dir. | 969 | 136 | 3.4 | 136 | 3.4 | 135 | 3.4 | T > L | Inv. ex.(2) |
| X10 | C12 | Plate width dir. | 981 | 132 | 3.2 | 133 | 3.3 | 133 | 3.3 | T > L | Inv. ex.(2) |
| X11 | C14 | Plate width dir. | 1004 | 138 | 3.7 | 137 | 3.6 | 137 | 3.7 | T > L | Inv. ex.(2) |
| X12 | C15 | Plate width dir. | 976 | 139 | 3.7 | 139 | 3.7 | 139 | 3.8 | T > L | Inv. ex.(2) |
| X13 | C16 | Plate width dir. | 949 | 139 | 3.7 | 139 | 3.7 | 138 | 3.7 | T > L | Inv. ex.(2) |

TABLE 7-continued

| | | Round bar | | | | Hot forged part | | | | | |
|---|---|---|---|---|---|---|---|---|---|---|---|
| | | Direction of material parallel to long axis direction of round | Round bar and thread rolled bar | | | Hot forged in the thickness direction of plate (T) | | Hot forged in the longitudinal direction of plate (L) | | Comparison of magnitude of | |
| No. | Material used | bar and hot forged part (reference direction) | Tensile strength MPa | Young's modulus GPa | Value of formula (2) | Young's modulus GPa | Value of formula (2) | Young's modulus GPa | Value of formula (2) | maximum load during hot forging#1 | Remarks |
| X14 | C17 | Plate width dir. | 1065 | 139 | 3.7 | 140 | 3.8 | 140 | 3.8 | T > L | Inv. ex.(2) |
| X15 | C18 | Plate width dir. | 1108 | 137 | 3.4 | 136 | 3.4 | 136 | 3.4 | T > L | Inv. ex.(2) |
| X16 | C19 | Plate width dir. | 1059 | 141 | 4.0 | 140 | 4.0 | 140 | 4.0 | T > L | Inv. ex.(2) |
| X17 | C20 | Plate width dir. | 1105 | 139 | 4.0 | 140 | 4.0 | 139 | 4.0 | T > L | Inv. ex.(2) |
| X18 | C21 | Plate width dir. | 1051 | 141 | 4.1 | 140 | 4.0 | 140 | 4.0 | T > L | Inv. ex.(2) |
| X19 | C1 | Plate width dir. | 627 | 125 | 1.0 | 126 | 1.06 | 126 | 1.1 | T > L | Inv. ex.(1) |
| X20 | C2 | Plate width dir. | 731 | 127 | 1.1 | 127 | 1.14 | 126 | 1.1 | T > L | Inv. ex.(1) |
| X21 | C13 | Plate width dir. | 1003 | 126 | 1.1 | 126 | 1.12 | 127 | 1.1 | T > L | Inv. ex.(1) |
| X22 | C4 | Plate long. dir. | 702 | 112 | 0.08 | 113 | 0.10 | | | | Comp. ex. |
| X23 | C8 | Plate long. dir. | 809 | 110 | 0.05 | 109 | 0.05 | | | | Comp. ex. |
| X24 | C11 | Plate long. dir. | 921 | 110 | 0.06 | 111 | 0.09 | | | | Comp. ex. |
| X25 | C17 | Plate long. dir. | 1011 | 112 | 0.10 | 113 | 0.13 | | | | Comp. ex. |

1: Shows relative magnitude of the maximum load when hot forged in the thickness direction of the plate (abbreviation "T") and when hot forged in the longitudinal direction of the plate (abbreviation "L").

X1 to X18 of Table 7 are examples with chemical composition within the scope of the present invention as shown in Table 6. These finished parts had Young's moduli of high 130 to 141 GPa and values of the formula (2) of large 3 or more.

Among Invention Examples (2), X2, X6, X8, X9, X11, X12, X14, X16, and X18 showed total contents of O and N of 0.12 to 0.30%, total contents of Fe, Cr, and Ni of 0.5 to 1.7%, values of the formula (1) of 0.5 to 5.3 or within preferable ranges, and Young's moduli of further higher values of 135 GPa or more.

W16 to W20 of Table 5 contained chemical compositions of Ti-5Al-1Fe which is shown in Table 1, so were within the range of the chemical composition of the present invention. They had Young's moduli of 135 GPa or more and values of the formula (2) of large 3 or more.

On the other hand, X22 to X25, finished parts which were prepared so that the reference directions, that is, the longitudinal directions (hot rolling directions) of the plates, corresponded to the long axis directions, had chemical compositions within the range of the chemical composition 1 of the present invention, but since the machining directions of these examples differed from those of the present invention by 90 degrees, the Young's moduli of the finished parts failed to reach 120 GPa and the values of the formula (2) also became less than 0.1.

X19 to X21 of Table 7 composed of C1, C2, and C13 of Table 6, respectively, which are outside of the ranges of the preferable chemical compositions of the present invention, that is, the chemical composition 1 and the chemical composition 2. The Young's moduli failed to reach the 130 GPa of the Invention Examples (2), but were sufficiently high compared with the conventional method of production (comparative examples of Table 4).

From the invention examples which are shown in Table 5, the parts which were hot forged with flat plates from the top and bottom and parts which were hot forged by dies simulating connecting rods showed almost the same Young's modulus and value of the formula (2). From this, it is learned that in X1 to X21 of Table 7 as well, hot forged parts by dies simulating connecting rods showed properties similar to those of the parts hot forged with flat plates from the top and bottom.

INVENTION EXAMPLE 3

The chemical composition 2 of the α+β-type titanium alloy of the present invention will be explained in further detail using the following invention examples.

α+β-type titanium alloy ingots comprised of alloying elements containing Mo, D1 to D24, which are shown in Table 8, were hot forged to produce 40 mm-thick-slabs. These slabs were heated at temperatures in the β-single phase region exceeding the β-transus, and then were uni-directionally hot rolled to produce plates of 10 mm in thickness (reduction in thickness of 75%).

Subsequently, the hot rolled plates were annealed at 750° C. for 1 hour and air cooled.

During uni-directionally hot rolling, to heat the slabs in the β-single phase region, materials whose β-transus estimated from formula (3) were 970° C. to 1019° C. were heated at 1050° C., while those whose β-transus were lower than 970° C. were heated at 1000° C.(See rightmost column of Table 8)

The materials comprised of the alloying elements listed in Table 8 and prepared by the above procedures were machined for round bars and some bars were thread rolled subsequently and hot forged parts with flat plates were also produced from the materials.

Table 9 shows the Young's moduli in the long axis directions of the same and the values of the formula (2) which were measured on the cross-sections vertical to the long axis directions. Furthermore, it shows the tensile strengths of the finished round bars. Note that, the tensile strengths, Young's moduli, and the values of the formula (2) were measured by the same methods as explained above.

Cold thread rolling was carried out to produce bolts.

In addition, hot forging using flat plates for compressing the materials from the top and bottom was performed for both the case of pressing the plates in the thickness directions (abbreviation "T") and the case of pressing the plates in the longitudinal directions (abbreviation "L") and the magnitudes of the maximum loads during hot forging were compared.

Hot forging with flat plates was conducted after heating the materials at 700° C. with a reduction in thicknesses of 50%.

TABLE 8

| No. | Chemical composition (mass %) | | | | | | | [O] + [N] | [Fe] + [Cr] + [Ni] | Value of formula (1) | Estimated β-transus (° C.) |
| --- | --- | --- | --- | --- | --- | --- | --- | --- | --- | --- | --- |
| | Al | Fe | Cr | Ni | Mo | O | N | | | | |
| D1  | 2.52 | 0.49 | 0.02 | 0.02 | 1.02 | 0.12 | 0.005 | 0.13 | 0.5 | 1.5  | 943  |
| D2  | 2.52 | 0.49 | 0.02 | 0.02 | 1.04 | 0.26 | 0.005 | 0.27 | 0.5 | 2.9  | 960  |
| D3  | 2.52 | 1.10 | 0.02 | 0.03 | 3.50 | 0.12 | 0.005 | 0.13 | 1.2 | -2.5 | 906  |
| D4  | 2.53 | 1.02 | 0.02 | 0.02 | 1.05 | 0.11 | 0.007 | 0.12 | 1.1 | 0.1  | 932  |
| D5  | 3.01 | 1.00 | 0.02 | 0.02 | 1.04 | 0.13 | 0.006 | 0.14 | 1.0 | 0.8  | 945  |
| D6  | 4.03 | 0.52 | 0.02 | 0.02 | 1.08 | 0.16 | 0.006 | 0.17 | 0.6 | 3.3  | 978  |
| D7  | 4.02 | 0.51 | 0.03 | 0.03 | 3.21 | 0.12 | 0.006 | 0.13 | 0.6 | 0.7  | 951  |
| D8  | 4.10 | 1.02 | 0.02 | 0.02 | 1.02 | 0.13 | 0.007 | 0.14 | 1.1 | 1.9  | 967  |
| D9  | 4.05 | 1.02 | 0.03 | 0.02 | 1.99 | 0.17 | 0.004 | 0.17 | 1.1 | 1.2  | 961  |
| D10 | 4.03 | 1.01 | 0.03 | 0.03 | 3.05 | 0.13 | 0.005 | 0.14 | 1.1 | -0.3 | 945  |
| D11 | 4.03 | 2.02 | 0.03 | 0.03 | 1.99 | 0.13 | 0.005 | 0.14 | 2.1 | -1.7 | 937  |
| D12 | 5.02 | 0.51 | 0.26 | 0.26 | 1.02 | 0.17 | 0.004 | 0.17 | 1.0 | 3.8  | 992  |
| D13 | 5.03 | 1.02 | 0.02 | 0.02 | 1.01 | 0.15 | 0.005 | 0.16 | 1.1 | 3.0  | 989  |
| D14 | 5.03 | 1.02 | 0.03 | 0.03 | 2.05 | 0.16 | 0.007 | 0.17 | 1.1 | 2.0  | 979  |
| D15 | 5.03 | 1.00 | 0.03 | 0.03 | 3.04 | 0.14 | 0.007 | 0.15 | 1.1 | 0.9  | 967  |
| D16 | 5.05 | 2.05 | 0.02 | 0.02 | 1.05 | 0.15 | 0.006 | 0.16 | 2.1 | 0.4  | 970  |
| D17 | 5.09 | 1.99 | 0.03 | 0.03 | 3.01 | 0.26 | 0.010 | 0.27 | 2.1 | -0.3 | 966  |
| D18 | 5.10 | 0.11 | 1.95 | 0.03 | 2.99 | 0.14 | 0.006 | 0.15 | 2.1 | 0.8  | 953  |
| D19 | 5.07 | 1.99 | 0.03 | 0.03 | 3.48 | 0.16 | 0.007 | 0.17 | 2.1 | -1.8 | 948  |
| D20 | 5.48 | 0.55 | 0.02 | 0.02 | 1.04 | 0.16 | 0.004 | 0.16 | 0.6 | 4.7  | 1007 |
| D21 | 5.51 | 0.51 | 0.02 | 0.02 | 1.04 | 0.25 | 0.012 | 0.26 | 0.6 | 5.8  | 1021 |
| D22 | 5.47 | 1.02 | 0.02 | 0.03 | 1.13 | 0.17 | 0.004 | 0.17 | 1.1 | 3.5  | 999  |
| D23 | 5.47 | 2.01 | 0.03 | 0.03 | 3.21 | 0.15 | 0.006 | 0.16 | 2.1 | -1.3 | 957  |
| D24 | 5.46 | 1.48 | 0.26 | 0.27 | 2.98 | 0.16 | 0.005 | 0.17 | 2.0 | -0.2 | 962  |

TABLE 9

| No. | Material used | Round bar material: Direction of material parallel to long axis direction of above round bar hot forged part (reference direction) | Round bar and thread rolled bar | | | Hot forged part from material | | | | Comparison of maximum load during hot forging#1 | Remarks |
| --- | --- | --- | --- | --- | --- | --- | --- | --- | --- | --- | --- |
| | | | Tensile strength MPa | Young's modulus GPa | Value of formula (2) | Hot forged in the thickness direction of plate (T) | | Hot forged in longitudinal direction of plate (L) | | | |
| | | | | | | Young's modulus GPa | Value of formula (2) | Young's modulus GPa | Value of formula (2) | | |
| Y1  | D1  | Plate width dir. | 902  | 136 | 3.4 | 136 | 3.5 | 136 | 3.3 | T > L | Inv. ex.(3) |
| Y2  | D2  | Plate width dir. | 947  | 137 | 3.5 | 137 | 3.6 | 138 | 3.7 | T > L | Inv. ex.(3) |
| Y3  | D4  | Plate width dir. | 910  | 134 | 3.3 | 135 | 3.3 | 135 | 3.3 | T > L | Inv. ex.(3) |
| Y4  | D5  | Plate width dir. | 916  | 136 | 3.4 | 135 | 3.4 | 135 | 3.4 | T > L | Inv. ex.(3) |
| Y5  | D6  | Plate width dir. | 980  | 139 | 4.0 | 139 | 4.0 | 139 | 4.0 | T > L | Inv. ex.(3) |
| Y6  | D7  | Plate width dir. | 1056 | 136 | 3.4 | 135 | 3.5 | 136 | 3.5 | T > L | Inv. ex.(3) |
| Y7  | D8  | Plate width dir. | 950  | 137 | 3.5 | 136 | 3.4 | 137 | 3.5 | T > L | Inv. ex.(3) |
| Y8  | D9  | Plate width dir. | 1034 | 136 | 3.4 | 136 | 3.4 | 136 | 3.4 | T > L | Inv. ex.(3) |
| Y9  | D10 | Plate width dir. | 1080 | 133 | 3.2 | 132 | 3.1 | 133 | 3.2 | T > L | Inv. ex.(3) |
| Y10 | D11 | Plate width dir. | 1067 | 131 | 3.1 | 132 | 3.1 | 131 | 3.1 | T > L | Inv. ex.(3) |
| Y11 | D12 | Plate width dir. | 1001 | 139 | 3.9 | 140 | 4.0 | 139 | 4.0 | T > L | Inv. ex.(3) |
| Y12 | D13 | Plate width dir. | 990  | 138 | 3.6 | 139 | 3.8 | 138 | 3.9 | T > L | Inv. ex.(3) |
| Y13 | D14 | Plate width dir. | 1067 | 137 | 3.5 | 137 | 3.6 | 137 | 3.6 | T > L | Inv. ex.(3) |
| Y14 | D15 | Plate width dir. | 1118 | 136 | 3.4 | 136 | 3.4 | 137 | 3.4 | T > L | Inv. ex.(3) |
| Y15 | D16 | Plate width dir. | 1046 | 133 | 3.2 | 132 | 3.2 | 133 | 3.2 | T > L | Inv. ex.(3) |
| Y16 | D17 | Plate width dir. | 1248 | 135 | 3.4 | 135 | 3.4 | 136 | 3.5 | T > L | Inv. ex.(3) |
| Y17 | D18 | Plate width dir. | 1174 | 135 | 3.4 | 135 | 3.4 | 135 | 3.3 | T > L | Inv. ex.(3) |
| Y18 | D19 | Plate width dir. | 1216 | 131 | 3.1 | 131 | 3.1 | 131 | 3.1 | T > L | Inv. ex.(3) |
| Y19 | D20 | Plate width dir. | 992  | 139 | 3.8 | 139 | 3.9 | 140 | 4.0 | T > L | Inv. ex.(3) |
| Y20 | D22 | Plate width dir. | 1045 | 138 | 3.6 | 137 | 3.7 | 138 | 3.7 | T > L | Inv. ex.(3) |
| Y21 | D23 | Plate width dir. | 1206 | 132 | 3.1 | 133 | 3.1 | 133 | 3.2 | T > L | Inv. ex.(3) |
| Y22 | D24 | Plate width dir. | 1192 | 133 | 3.2 | 133 | 3.2 | 132 | 3.1 | T > L | Inv. ex.(3) |
| Y23 | D3  | Plate width dir. | 1058 | 126 | 1.1 | 125 | 1.1 | 126 | 1.1 | T > L | Inv. ex.(1) |
| Y24 | D21 | Plate width dir. | 1044 | 126 | 1.1 | 127 | 1.2 | 126 | 1.1 | T > L | Inv. ex.(1) |
| Y25 | D4  | Plate long. dir. | 859  | 108 | 0.05 | 109 | 0.08 | | | | Comp. ex. |
| Y26 | D8  | Plate long. dir. | 905  | 109 | 0.06 | 109 | 0.07 | | | | Comp. ex. |
| Y27 | D17 | Plate long. dir. | 1178 | 109 | 0.08 | 110 | 0.12 | | | | Comp. ex. |

1Shows comparison of the maximum load when hot forged in the thickness direction of the plate (abbreviation "T") and when hot forged in the long direction of the plate (abbreviation "L").

Y1 to Y22 of Table 9 contained the chemical compositions within the range of the chemical composition 2 of the present invention as shown in Table 8. The machined parts showed tensile strengths of 900 MPa or more, high Young's moduli of 130 to 140 GPa, and values of the formula (2) of large 3 or more.

Y5 to Y22 using 05 to D20 and D22 to D24 which contain Al in the preferable range of 4.0 to 5.5% had tensile strengths of 980 MPa or more or equal to or better than the comparative examples using round bars of Ti—6Al—4V (V1 and V2).

Y1, Y2, Y4 to 8, Y11 to 14, Y17, Y19, and Y20 showed total contents of O and N of 0.12 to 0.30%, values of the formula (1) of 0.5 to 5.3 or in the preferable range, and Young's moduli of further higher 135 GPa or more.

W21 to W25 in Table 5 also contained the chemical compositions of the Ti-5Al-2Fe-3Mo which is shown in Table 1, so were within the chemical composition 2 of the present invention. They showed tensile strengths of over 1000 MPa, Young's moduli of 130 GPa or more, and values of the formula (2) of large 3 or more.

On the other hand, Y25 to Y27 having inappropriate machining directions, that is, longitudinal directions (hot rolling directions) of the plate materials, corresponding to the long axis directions of the finished products, had chemical compositions with the range of the chemical composition 2 of the present invention, but since they had inappropriate machining directions different from the invention by 90 degrees, the Young's moduli of the worked parts failed to reach 120 GPa and the values of the formula (2) were also small ones of less than 0.1.

Y23 and Y24 of Table 9 used D2 and D21 of Table 7 outside of the chemical composition 2. The Young's moduli of these examples failed to reach those of Invention Examples (2) and Invention Examples (3), that is, 130 GPa, but they had moduli of 125 to 127 GPa or sufficiently high compared with the conventional method of production (comparative examples in Table 4).

It is obvious from Table 5 and Y1 to Y24 of Table 9 that the products by hot forging with dies simulating connecting rods have characteristics equal to those of the products by hot forging the materials with flat plates from the top and bottom.

INVENTION EXAMPLES 4

A preferable method of production of a connecting rod of the present invention will be explained in further detail using the following invention examples which were hot forged using dies simulating connecting rods.

As the material, slabs (thickness of 150 mm) were prepared by hot forging ingots obtained by vacuum melting which contain the chemical composition of C17 of Table 6 and that of D14 of Table 8, and then were heated at 1050° C. and uni-directionally hot rolled with a reduction in thickness of 80% to prepare plates.

Furthermore, the hot rolled plates were annealed at 750° C. for 1 hour and air cooled.

In addition to the above two alloys, B3, B8, B13, B18, and B23 of Table 3, a total of seven types of materials were used and hot forged by dies simulating connecting rods.

Hot forging in the thickness direction of the plates (abbreviation "T") was compared to that in the longitudinal directions of the plates (abbreviation "L"). Heating temperature prior to hot forging was 800° C.. The shape of the rounded corner of the parts which were hot forged with dies simulating connecting rods was visually examined.

Table 10 shows the materials used, the machined directions, the Young's moduli in the long axis direction of the parts which were hot forged by dies simulating connecting rods, the values of the formula (2) of the cross-sections, the shape of the rounded corner, and the reduction ratio of the maximum loads of the abbreviation "L" against the abbreviation "T" during hot forging. Both the Young's moduli and the values of the formula (2) were measured by methods similar to the above-mentioned methods.

TABLE 10

| | | | | Hot forging with die simulating connecting rod | | | | | | |
|---|---|---|---|---|---|---|---|---|---|---|
| | | | Direction of material parallel to long axis direction of hot forged part (machined direction) | Hot forging in the thickness direction of plate (abbreviation "T") | | | Hot forging in the longitudinal direction of plate (T-cross-section side of plate) (abbreviation "L") | | | Reduction ratio of maximum load during hot forging#2 |
| No. | | Materials used | | Young's modulus GPa | Value of formula (2) | Shape of rounded corner #1 | Young's modulus GPa | Value of formula (2) | Shape of rounded corner #1 | (L with respect to T) | Remarks |
| Z1 | B3 | Ti—6Al—4V | Plate width dir. | 126 | 1.1 | B | 125 | 1.1 | A | Δ9% | Inv. ex.(4) |
| Z2 | B8 | Ti—3Al—2.5V | Plate width dir. | 127 | 1.1 | B | 127 | 1.1 | A | Δ10% | Inv. ex.(4) |
| Z3 | B13 | Ti—1Fe—0.35O | Plate width dir. | 128 | 1.2 | B | 128 | 1.3 | A | Δ11% | Inv. ex.(4) |
| Z4 | B18 | Ti—5Al—1Fe | Plate width dir. | 138 | 3.2 | B | 139 | 3.5 | A | Δ14% | Inv. ex.(4) |
| Z5 | B23 | Ti—5Al—2Fe—3Mo | Plate width dir. | 131 | 3.1 | B | 130 | 3.0 | A | Δ12% | Inv. ex.(4) |
| Z6 | C17 | — | Plate width dir. | 139 | 3.7 | B | 140 | 3.8 | A | Δ14% | Inv. ex.(4) |
| Z7 | D14 | — | Plate width dir. | 137 | 3.5 | B | 137 | 3.6 | A | Δ13% | Inv. ex.(4) |

1: In forged parts hot forged with a die simulating a connecting rod, the shape (sharpness) of the rounded corner was visually observed. B indicates no problem (same as with forging the conventional round bar material), while A indicates extremely sharp.
2Reduction ratio of the maximum load of hot forging plate in the longitudinal direction (abbreviation "L") with respect to hot forging plate in the thickness direction (abbreviation "T").

Z1 to Z7 of Table 10 show 125 GPa or higher Young's modulus and 1.1 or higher value of the formula (2), irrespective of the forging direction. The shape (sharpness) of the rounded corner in a forged part (abbreviation "T") when forging a plate from the thickness direction was as good as that of V1 to V10 of Table 4 using the conventional round bar material, both of which satisfied the normal level of sharpness (B); however, a forged part by pressing a material plate from the longitudinal direction of it (abbreviation "L") satisfied much higher level of sharpness (A).

The maximum load during hot forging was 9 to 14% (about 10%) lower in the case of pressing the plate in the longitudinal direction (abbreviation "L"), than in the case of pressing the plate in the thickness direction (abbreviation "T")

Further, in the case of hot forging the plates shown in Table 5, Table 7, and Table 9, the maximum load during hot forging was in all cases larger in the case of pressing the plate in the thickness direction (abbreviation "T") than in the case of pressing the plate in the longitudinal direction (abbreviation "T"). (in the table, indicated as "T>L")

From this result, it is learned that the load during hot forging can be lowered when forging the plate in the longitudinal direction of it (pressing the plate on the T-cross-section of it).

As explained above, according to a preferable method of production of the present invention, it is possible to lower the load during hot forging and produce a connecting rod with a precise shape and dimension and a high Young's modulus.

The invention claimed is:

1. An α+β titanium alloy part wherein an X-ray diffraction intensity I(0002) from an (0002) plane of a titanium α-phase which is measured on a cross-section vertical to said long axis direction, an X-ray diffraction intensity I(10-10) from an (10-10) plane, and an X-ray diffraction intensity I(10-11) from an (10-11) plane satisfy $I(0002)/[I(10-10)+I(10-11)] \geq 1$.

2. The α+β titanium alloy part as set forth in claim 1, wherein said α+β titanium alloy part is a bolt.

3. The α+β titanium alloy part as set forth in claim 1, wherein said α+β titanium alloy part is an engine valve.

4. The α+β titanium alloy part as set forth in claim 1, wherein said α+β titanium alloy part is a connecting rod.

5. The α+β titanium alloy part as set forth in claim 1, wherein said α+β titanium alloy contains, by mass %, Al: 0.5 to 5.5%, contains O and N in a total of 0.04 to 0.35%, further contains one or more of Fe, Cr, or Ni in a total of 0.5 to 2.5%, has a value of the following formula (1) of −2.0 to 5.3, and has a balance of Ti and unavoidable impurities:

$$[Al]+10[O]+10[N]-[Mo]-2.5[Fe]-1.25[Cr]-1.25[Ni] \qquad \text{formula (1)}$$

wherein [Al], [O], [N], [Mo], [Fe], [Cr], and [Ni] are respectively the concentrations (mass %) of Al, O, N, Mo, Fe, Cr and Ni.

6. The α+β titanium alloy part as set forth in claim 5, wherein said α+β titanium alloy further contains Mo: 1.0 to 3.5%.

* * * * *